(12) United States Patent
Cha et al.

(10) Patent No.: US 11,360,347 B2
(45) Date of Patent: Jun. 14, 2022

(54) WINDOW SUBSTRATE INTEGRATED WITH POLARIZING PLATE AND METHOD OF PREPARING THE SAME

(71) Applicant: DONGWOO FINE-CHEM CO., LTD., Jeollabuk-do (KR)

(72) Inventors: Jae Hun Cha, Gyeonggi-do (KR); Jong Min Kim, Gyeonggi-do (KR); Il Woo Park, Gyeonggi-do (KR); Han Bae Lee, Gyeonggi-do (KR); Jin Gyu Cha, Gyeonggi-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 244 days.

(21) Appl. No.: 15/958,110

(22) Filed: Apr. 20, 2018

(65) Prior Publication Data

US 2018/0239191 A1 Aug. 23, 2018

Related U.S. Application Data

(63) Continuation of application No. PCT/KR2016/011811, filed on Oct. 20, 2016.

(30) Foreign Application Priority Data

Oct. 20, 2015 (KR) .................. 10-2015-0145935
Nov. 17, 2015 (KR) .................. 10-2015-0161221

(51) Int. Cl.
*G02F 1/1335* (2006.01)
*G02B 5/30* (2006.01)
(Continued)

(52) U.S. Cl.
CPC ..... *G02F 1/133528* (2013.01); *G02B 5/3016* (2013.01); *G02F 1/13338* (2013.01);
(Continued)

(58) Field of Classification Search
CPC .......... G02F 1/133528; G02F 1/13338; G02F 1/133512; G02F 1/13363; G02F 1/133638; G02B 5/3016
(Continued)

(56) References Cited

U.S. PATENT DOCUMENTS 5,486,935 A * 1/1996 Kalmanash .......... G02B 5/3016
349/104
6,317,263 B1 * 11/2001 Moshrefzadeh ..... G03B 21/625
359/443
(Continued)

FOREIGN PATENT DOCUMENTS

CN 102769024 A 11/2012
JP 2002-215067 A 7/2002
(Continued)

OTHER PUBLICATIONS

Office action dated Mar. 5, 2019 from Korean Patent Office in a counterpart Korean Patent Application No. 10-2015-0145935 (all the cited references are listed in this IDS.) (English translation is submitted herewith.).
(Continued)

*Primary Examiner* — Edward J Glick
*Assistant Examiner* — David Y Chung
(74) *Attorney, Agent, or Firm* — The PL Law Group, PLLC

(57) ABSTRACT

A window substrate integrated with a polarizing plate and a method of preparing the same is provided. A window substrate integrated with a polarizing plate comprises a base substrate, a non-display pattern disposed on a non-display part of one surface of the base substrate, and a liquid crystal polarizing layer disposed on a display part of the same surface as the non-display pattern. A display device having (Continued)

a reduced thickness and a colored non-display pattern is achieved using the widow substrate.

20 Claims, 18 Drawing Sheets

(51) Int. Cl.
   *G02F 1/13363* (2006.01)
   *G02F 1/1333* (2006.01)
(52) U.S. Cl.
   CPC .... *G02F 1/13363* (2013.01); *G02F 1/133512* (2013.01); *G02F 1/133638* (2021.01)
(58) Field of Classification Search
   USPC ............. 349/16, 96, 110, 117–121, 193, 194
   See application file for complete search history.

(56) References Cited

U.S. PATENT DOCUMENTS

| | | | | |
|---|---|---|---|---|
| 7,667,784 | B2* | 2/2010 | Kim | G02F 1/133512 |
| | | | | 257/59 |
| 8,796,704 | B2* | 8/2014 | Hatta | H01L 27/3213 |
| | | | | 257/59 |
| 2002/0054261 | A1* | 5/2002 | Sekiguchi | G02F 1/13338 |
| | | | | 349/122 |
| 2004/0057007 | A1 | 3/2004 | Tazaki et al. | |
| 2007/0024781 | A1* | 2/2007 | Choi | G02F 1/133528 |
| | | | | 349/117 |
| 2009/0310055 | A1* | 12/2009 | Kim | G02F 1/133528 |
| | | | | 349/58 |
| 2010/0085507 | A1* | 4/2010 | Cho | G02F 1/133308 |
| | | | | 349/62 |
| 2012/0268700 | A1* | 10/2012 | Shu | G03F 7/0007 |
| | | | | 349/106 |
| 2012/0280259 | A1 | 11/2012 | Hatta et al. | |
| 2013/0083276 | A1* | 4/2013 | Iwahashi | G02B 30/35 |
| | | | | 349/117 |
| 2014/0305578 | A1* | 10/2014 | Yang | B32B 37/003 |
| | | | | 156/249 |
| 2015/0116631 | A1* | 4/2015 | Kim | G02F 1/133308 |
| | | | | 349/58 |
| 2015/0188081 | A1* | 7/2015 | Kim | G02F 1/133308 |
| | | | | 257/40 |
| 2015/0276992 | A1* | 10/2015 | Park | G02F 1/133528 |
| | | | | 428/212 |
| 2016/0026278 | A1* | 1/2016 | Lee | G06F 3/041 |
| | | | | 428/212 |
| 2016/0170110 | A1* | 6/2016 | Pau | C09K 19/38 |
| | | | | 356/364 |
| 2016/0369131 | A1* | 12/2016 | Lim | G02B 5/003 |
| 2018/0072952 | A1* | 3/2018 | Ikeda | C09K 19/2014 |

FOREIGN PATENT DOCUMENTS

| | | |
|---|---|---|
| JP | 2004-219825 A | 8/2004 |
| JP | 2004-302075 A | 10/2004 |
| JP | 2010-286597 A | 12/2010 |
| KR | 10-2004-0102862 A | 12/2004 |
| KR | 10-0814339 B1 | 3/2008 |
| KR | 10-2008-0089991 A | 10/2008 |
| KR | 10-2009-0065017 A | 6/2009 |
| KR | 10-2010-0024784 A | 3/2010 |
| KR | 10-0975120 B1 | 8/2010 |
| KR | 10-2012-0038133 A | 4/2012 |
| KR | 10-2012-0119083 A | 10/2012 |
| KR | 10-2013-0106633 A | 9/2013 |
| KR | 10-2013-0116748 A | 10/2013 |
| KR | 10-2014-0028327 A | 3/2014 |
| KR | 10-1427136 B1 | 8/2014 |
| KR | 10-2014-0142419 A | 12/2014 |
| KR | 10-2015-0020438 A | 2/2015 |
| WO | WO 01/81991 A1 | 11/2001 |

OTHER PUBLICATIONS

Office action dated Jun. 27, 2019 from Korean Patent Office in a counterpart Korean Patent Application No. 10-2015-0161221 (all the cited references are listed in this IDS.) (English translation is submitted herewith.).
International Search Report for PCT/KR2016/011811.
Office action dated Aug. 18, 2020 from Japan Intellectual Property Office in a counterpart Japanese Patent Application No. 2018-0520144 (all the cited references are listed in this IDS.) (English translation is submitted herewith).
Office action dated Apr. 2, 2021 from China Patent Office in a counterpart China Patent Application No. 20168060893.6 (all the cited references are listed in this IDS.) (English translation is also submitted herewith.).
Office action dated May 11, 2021 from Japan Intellectual Property Office in a counterpart Japanese Patent Application No. 2018-520144 (all the cited references are listed in this IDS.) (English translation is submitted herewith).

* cited by examiner

WINDOW SUBSTRATE INTEGRATED WITH POLARIZING PLATE AND METHOD OF PREPARING THE SAME

CROSS REFERENCE TO RELATED APPLICATIONS AND CLAIM OF PRIORITY

The present application is a continuation application to International Application No. PCT/KR2016/011811 with an International Filing Date of Oct. 20, 2016, which claims the benefit of Korean Patent Application Nos. 10-2015-0145935 filed on Oct. 20, 2015 and 10-2015-0161221 filed Nov. 17, 2015 at the Korean Intellectual Property Office, the disclosures of which are incorporated by reference herein in their entirety.

BACKGROUND

1. Field of the Invention

The present invention relates to a window substrate integrated with a polarizing plate and a method of preparing the same.

2. Description of the Related Art

Recently, according to development of the information-oriented society, display devices that can display information are being actively developed. The display device includes a liquid crystal display device, organic electro-luminescence display device, plasma display panel, field emission display device, or the like.

Among the display devices, the organic electro-luminescence display device is a self-emitting light type display which electrically excites a fluorescent organic compound contained therein to emit light. The organic electro-luminescence display device has advantages of being thin, a low voltage driving, and the like.

Such the organic electro-luminescence display device displays an image using light emitted by an organic light emitting diode (OLED), and when the light is made incident thereon, the incident light is again made incident on a polarizing plate and a retardation film in sequence, and then is again reflected by an electrode part included in the OLED. Due to the light again reflected by the electrode part included in the OLED, a problem such as a glare phenomenon occurs when a user views the organic electro-luminescence display device.

In addition, a method that blocks the light reflected by the electrode part to eliminate the glare phenomenon felt by the user has been proposed.

Recently, studies into a flexible display which is thinner and lighter than a conventional panel by using a polymer film instead of a glass substrate and can be bent to some degrees are actively conducted. Accordingly, touch sensing patterns, etc. are formed on the conventional glass substrate, but due to a limit that cannot achieve flexible properties, the glass substrate is replaced by a film material. The largest problem in the flexible display is entailed in an entire thickness of a display panel, and as the thickness thereof is increased, a possibility of damage is increased due to an increased impact applied thereto when the display panel is bent. Therefore, decreasing the thickness of each component included in the display panel is a key goal in the art.

The organic electro-luminescence display device uses a polarizing plate to block the reflected light, and such the polarizing plate is provided with a polarizer and protective films adhered on both surfaces of the polarizer. Therefore, there is a problem that an entire thickness of the display panel is increased due to a total of three films used in the polarizing plate.

Korean Patent Laid-Open Publication No. 2012-0038133 discloses an organic light emitting diode display device and a method of driving the same, however, has not proposed an alternative solution in regard to the foregoing problems.

SUMMARY

Accordingly, it is an object of the present invention to provide a window substrate integrated with a polarizing plate that can significantly reduce a thickness of the display device.

Another object of the present invention is to provide a method of preparing a window substrate integrated with a polarizing plate.

The above objects of the present invention will be achieved by the following characteristics:

(1) A window substrate integrated with a polarizing plate comprising: a base substrate; a non-display pattern disposed on a non-display part of one surface of the base substrate; and a liquid crystal polarizing layer disposed on a display part of the same surface as the non-display pattern.

(2) The window substrate integrated with a polarizing plate according to the above (1), wherein the non-display pattern directly contacts the base substrate.

(3) The window substrate integrated with a polarizing plate according to the above (1), wherein the non-display pattern includes a first pattern that defines the display part and the non-display part, and a second pattern having a light-shielding property which covers the non-display part on which the first pattern is disposed.

(4) The window substrate integrated with a polarizing plate according to the above (1), wherein the non-display pattern has a thickness of the liquid crystal polarizing layer or more.

(5) The window substrate integrated with a polarizing plate according to the above (1), further comprising a retardation layer disposed on the liquid crystal polarizing layer.

(6) The window substrate integrated with a polarizing plate according to the above (5), wherein the retardation layer is a ¼ wavelength plate.

(7) The window substrate integrated with a polarizing plate according to the above (5), wherein the retardation layer is a double layer of a ¼ wavelength plate and a ½ wavelength plate.

(8) The window substrate integrated with a polarizing plate according to the above (5), further comprising a refractive index control layer disposed on the retardation layer.

(9) The window substrate integrated with a polarizing plate according to the above (1), further comprising an aqueous over-coating layer disposed on the liquid crystal polarizing layer; and a leveling layer disposed on the over-coating layer to planarize the display part and the non-display part.

(10) The window substrate integrated with a polarizing plate according to the above (9), wherein the over-coating layer is disposed on the non-display pattern and the liquid crystal polarizing layer.

(11) The window substrate integrated with a polarizing plate according to the above (9), further comprising a retardation layer disposed on the leveling layer.

(12) The window substrate integrated with a polarizing plate according to the above (11), wherein the non-display pattern is disposed on at least a portion of the non-display part, and the leveling layer is disposed on a remaining region of the non-display part.

(13) The window substrate integrated with a polarizing plate according to the above (12), further comprising a color pattern on a region corresponding to the leveling layer of the non-display part on the retardation layer.

(14) The window substrate integrated with a polarizing plate according to the above (13), further comprising a light-shielding pattern on the color pattern.

(15) An optical laminate comprising: the window substrate integrated with a polarizing plate according to any one of the above (1)-(14); and a touch panel disposed on the one surface of the base substrate.

(16) An image display device comprising the optical laminate according to the above (15).

(17) A method of preparing a window substrate integrated with a polarizing plate, comprising: preparing a base substrate including a display part and a non-display part;

forming a liquid crystal polarizing layer on one surface of the base substrate in the display part; and forming a non-display pattern on the one surface of the base substrate in the non-display part.

(18) The method according to the above (17), wherein the display part is defined by the non-display pattern, and the liquid crystal polarizing layer is formed on the display part defined by the non-display pattern.

(19) The method according to the above (17), wherein forming the liquid crystal polarizing layer includes:

forming the liquid crystal polarizing layer on an surface of a carrier film; and peeling-off the liquid crystal polarizing layer from the carrier film to be adhered to the display part of the base substrate.

(20) The method according to claim 17, wherein forming the liquid crystal polarizing layer includes: adhering a release film having an opening that corresponds to the display part to the one surface of the base substrate; forming the liquid crystal polarizing layer on the display part of the base substrate through the opening of the release film; and peeling-off the release film.

The window substrate integrated with a polarizing plate of the present invention includes the liquid crystal polarizing layer, such that a polarizing plate using three films of a polarizer and protective films adhered on both surfaces of the polarizer is not required, and thereby having a significantly thin thickness. Therefore, a display device having a reduced thickness with light weight may be achieved.

The window substrate integrated with a polarizing plate of the present invention includes the color non-display pattern, so as to allow a user to view the color of the non-display pattern.

The method of preparing a window substrate integrated with a polarizing plate of the present invention may prepare a window substrate that can achieve the color non-display pattern while reducing waste of a material for forming the liquid crystal polarizing layer.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
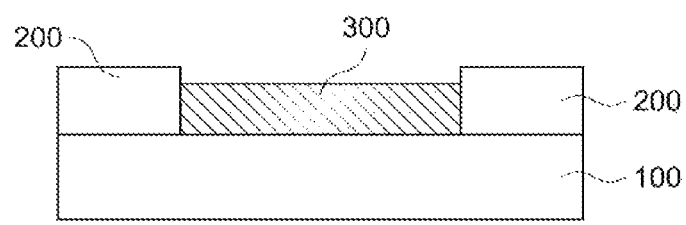
FIG. 1 is a schematic cross-sectional view illustrating a window substrate integrated with a polarizing plate according to one embodiment of the present invention.
Figure 2:
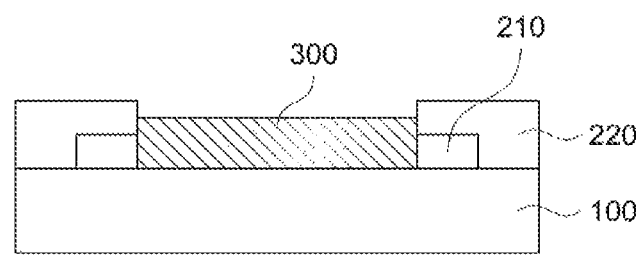
FIG. 2 is a schematic cross-sectional view illustrating the window substrate integrated with a polarizing plate according to one embodiment of the present invention.
Figure 3:
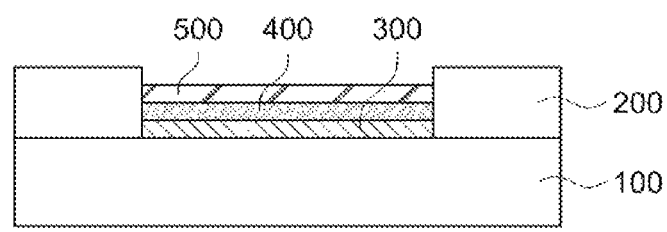
FIG. 3 is a schematic cross-sectional view illustrating the window substrate integrated with a polarizing plate according to one embodiment of the present invention.

The present invention provides a window substrate integrated with a polarizing plate and a method of preparing the same. The window substrate integrated with a polarizing plate includes: a base substrate; a non-display pattern disposed on a non-display part of one surface of the base substrate; and a liquid crystal polarizing layer disposed on a display part of the same surface as the non-display pattern, thereby a polarizing plate using three films of a polarizer and protective films adhered on both surfaces of the polarizer is not required. Therefore, a display device having a reduced thickness with light weight may be achieved, and a color non-display pattern may be achieved.

Hereinafter, preferred embodiments are proposed to more concretely describe the present invention. However, the following embodiments are only given for illustrating the present invention and those skilled in the art will obviously understand that various alterations and modifications are possible within the scope and spirit of the present invention. Such alterations and modifications are duly included in the appended claims.

The window substrate integrated with a polarizing plate of the present invention includes: a base substrate 100; a non-display pattern 200 disposed on a non-display part of one surface of the base substrate 100; and a liquid crystal polarizing layer 300 disposed on a display part of the same surface as the non-display pattern.

The base substrate 100 may be prepared of any material, which is not particularly limited so long as it has high durability to sufficiently protect a liquid crystal display device, a touch screen panel, and the like, from external forces and allow a user to view the display very well, and any base substrate 100 used in the related art may be adopted without particular limitation thereof. For example, glass, polyethersulfone (PES), polyacrylate (PAR), polyetherimide (PEI), polyethylene naphthalate (PEN), polyethylene terephthalate (PET), polyphenylene sulfide (PPS), polyallylate, polyimide, polycarbonate (PC), cellulose triacetate (TAC), cellulose acetate propionate (CAP), or the like, may be used.

A thickness of the base substrate 100 is not particularly limited, and may be, for example, 10 to 200 μm. If the thickness thereof is less than 10 μm, it is difficult to achieve a sufficient hardness, strength, or the like as a window substrate. If the thickness thereof exceeds 200 μm, an entire thickness of the window substrate may be increased to causes a difficulty in reducing a thickness and weight thereof.

The base substrate 100 includes a display part which displays an image when applying to an image display device, and a non-display part which forms a portion of a housing of an electronic device and does not display the image due to being hidden by the non-display pattern 200. For example, the image may also be output in the non-display part, but since the image displayed in the non-display part is hidden by the non-display pattern 200, the user may not view the image.

The non-display pattern 200 may be disposed on the non-display part of one surface of the base substrate 100.

The non-display pattern 200 forms a boundary between the display part and the non-display part, so that a lower wiring, etc. as a light-shielding pattern is not viewed by the user.

A conventional window substrate integrated with a polarizing plate using the liquid crystal polarizing layer 300 instead of the polarizing plate for reducing a thickness thereof includes the liquid crystal polarizing layer 300 coated on the entire one surface of the base substrate, and non-display pattern 200 formed on the non-display part above the liquid crystal polarizing layer 300. Thereby, when applying to an image display device, etc., since light made incident on the non-display pattern 200 from a display panel is viewed by the user through the liquid crystal polarizing layer 300, there is a problem that the user cannot view a color of the non-display pattern 200.

However, the non-display pattern 200 according to the present invention directly contacts to the base substrate 100, such that the light made incident on the non-display pattern 200 from the display panel is viewed by the user without passing through the liquid crystal polarizing layer 300. Therefore, the non-display pattern 200 is formed by various colors, such that the user may view the non-display pattern 200 having various colors.

The non-display pattern 200 according to the present invention may be a single layer or a double layer.

The non-display pattern 200 of a single layer is a light-shielding pattern having a color to be achieved.

The non-display pattern 200 of a double layer may be a laminate in which the length-shielding patterns having colors to be achieved are laminated in two layers.

In addition, the non-display pattern 200 of a double layer may include a first pattern 210 that forms the boundary between the display part and the non-display part, and a second pattern having a light-shielding property 220 that covers the non-display part in which the first pattern 210 is disposed.

The first pattern 210 forms the boundary between the display part and the non-display part, and may be disposed on only edges of the display part and the non-display part, or may be disposed on the entire non-display part.

The first pattern 210 may be transparent or opaque. Even when the first pattern 210 is transparent, the second pattern 220 has a light-shielding property, such that it is possible to prevent the lower wiring from being viewed by the user.

The second pattern 220 is a pattern having a light-shielding property that covers the non-display part in which the first pattern 210 is disposed.

The first pattern 210 and the second pattern 220 may be each independently a single-layered pattern or a double-layered pattern.

When the first pattern 210 or the second pattern 220 is the double-layered pattern, the respective layers may be each independently transparent or opaque. However, at least one layer of the second pattern 220 is opaque.

A thickness of the non-display pattern 200 is not particularly limited, and may be, for example, 1 to 100 μm. It is preferable that the non-display pattern 200 has a thickness of the liquid crystal polarizing layer 300 or more in terms of manufacturing process efficiencies.

The non-display pattern 200 may have an icon, IR, logo, or the like engraved therein.

The liquid crystal polarizing layer 300 may be disposed on the same surface as the non-display pattern 200.

A conventional polarizing plate includes the polarizer and the protective films adhered to both surfaces thereof, but the liquid crystal polarizing layer 300 of the present invention uses a coating layer which plays a role of the polarizer, such that there is an advantage of capable of significantly reducing the thickness thereof.

The liquid crystal polarizing layer 300 includes a liquid crystal layer 320 and an alignment layer 310, and may be formed by aligning the liquid crystal layer 320 using the alignment layer 310 subjected to alignment treatment.

The liquid crystal polarizing layer 300 is disposed on the display part, and as described above, the light made incident on the non-display pattern 200 is viewed by the user without passing through the liquid crystal polarizing layer 300, so as to allow the user to view the non-display pattern 200 having various colors.

A thickness of the liquid crystal polarizing layer 300 is not particularly limited, and may be, for example, 1 to 30 μm. If the thickness thereof is less than 1 μm, adhesion of the liquid crystal polarizing layer 300 with respect to the base substrate 100 may be insufficient. If the thickness thereof exceeds 30 μm, the entire thickness of the window substrate may be increased to causes a difficulty in reducing a thickness thereof.

The window substrate integrated with a polarizing plate of the present invention may further include a retardation layer 400 disposed on the liquid crystal polarizing layer 300.

The retardation layer 400 may be a coating layer or a film.

The retardation layer 400 may be a single layer or a double layer, and in a case of the single layer, the retardation layer may be a ¼ wavelength plate, while in a case of the double layer, the retardation layer may be a ½ wavelength plate, but it is not limited thereto. When the retardation layer is a double layer of the ¼ wavelength plate and the ½ wavelength plate, it is possible to obtain excellent color sense and image quality due to retardation correction when applying to an image display device.

A thickness of the retardation layer 400 is not particularly limited, and may be, for example, 1 to 100 μm. If the thickness thereof is less than 1 μm, retardation properties may be decreased. If the thickness thereof exceeds 100 μm, the entire thickness of the window substrate may be increased to causes a difficulty in reducing a thickness thereof.

The window substrate integrated with a polarizing plate of the present invention may further include a refractive index control layer 500 disposed on the retardation layer 400.

The refractive index control layer 500 is a layer that serves to improve the color sense by controlling a refractive index when applying to the image display device.

The refractive index control layer 500 may be a coating layer or a film. For example, the refractive index control layer 500 may use an elongated film type or liquid crystal coating type C-plate.

A thickness of the refractive index control layer 500 is not particularly limited, and may be, for example, 1 to 30 μm. If the thickness thereof is less than 1 μm, retardation properties may be decreased. If the thickness thereof exceeds 30 μm, the entire thickness of the window substrate may be increased to causes a difficulty in reducing a thickness of the image display device.

Figure 35:
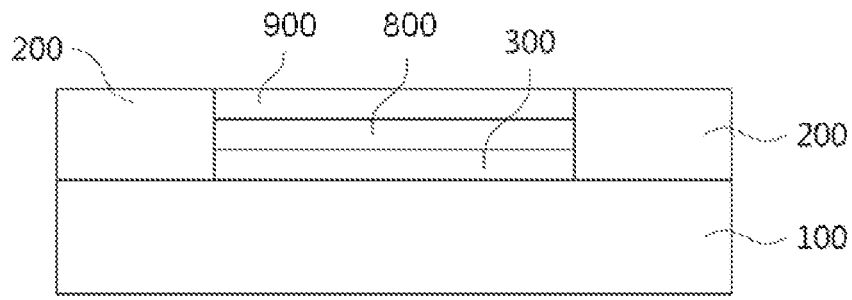
FIGS. 35 to 38 are schematic cross-sectional views illustrating window substrates integrated with a polarizing plate according to some embodiments of the present invention.

According to another embodiment of the present invention, as illustrated in FIG. 35, the window substrate integrated with a polarizing plate of the present invention may further include an aqueous over-coating layer 800 and a leveling layer 900.

The aqueous over-coating layer 800 is disposed on the liquid crystal polarizing layer 300 and functions to protect the liquid crystal polarizing layer 300.

When using an over-coating composition including an organic solvent, the liquid crystal polarizing layer 300 may be damaged. Therefore, in the present invention, an aqueous over-coating composition is used.

A composition for forming an aqueous over-coating layer may include an aqueous organic binder resin known in the related art and water, and may further include an additive such as inorganic particles.

A thickness of the aqueous over-coating layer 800 is not particularly limited, and may be, for example, 0.3 to 10 μm. If the thickness thereof is less than 0.3 μm, sufficient protective effects may not be achieved, thereby being vulnerable to an occurrence of coating defects such as impurities. If the thickness thereof exceeds 10 μm, the entire thickness of the window substrate may be increased to causes a difficulty in reducing a thickness of the image display device, and the thickness in a non-drying state may be highly increased to cause a problem in coating reliability.

Figure 36:
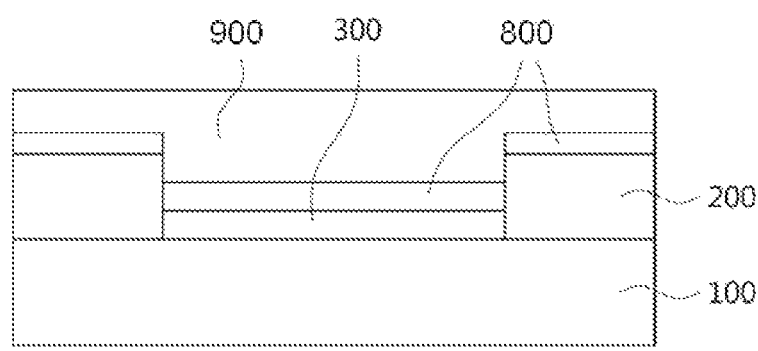

Also, as illustrated in FIG. 36, the aqueous over-coating layer 800 may be disposed on the non-display pattern 200.

The leveling layer 900 is disposed on the over-coating layer 800 to planarize the display part and the non-display part.

Conventionally, the window substrate integrated with a polarizing plate includes the retardation layer 400 on the liquid crystal polarizing layer 300, and the non-display pattern 200 formed on the retardation layer 400.

However, in the window substrate integrated with a polarizing plate of the present invention, as described above, the non-display pattern 200 directly contacts to the base substrate 100, and the liquid crystal polarizing layer 300 is disposed on the display part. Accordingly, due to a step between the liquid crystal polarizing layer 300 and the non-display pattern 200, it may be difficult to form the retardation layer 400 on the liquid crystal polarizing layer 300. Therefore, the window substrate integrated with a polarizing plate of the present invention further includes the leveling layer 900 to planarize the display part and the non-display part, thereby solving the above-described problem.

The leveling layer 900 may be made of a composition for forming the leveling layer 900 including an organic binder resin, organic solvent, etc. known in the related art.

As illustrated in FIG. 35, the leveling layer 900 is disposed on the aqueous over-coating layer 800 to eliminate the step between the aqueous over-coating layer 800 and the non-display pattern 200, and thereby planarizing the display part and the non-display part.

In addition, when the over-coating layer is disposed on the liquid crystal polarizing layer 300 and the non-display pattern 200, as illustrated in FIG. 36, the leveling layer 900 may planarize the display part and the non-display part.

Figure 37:
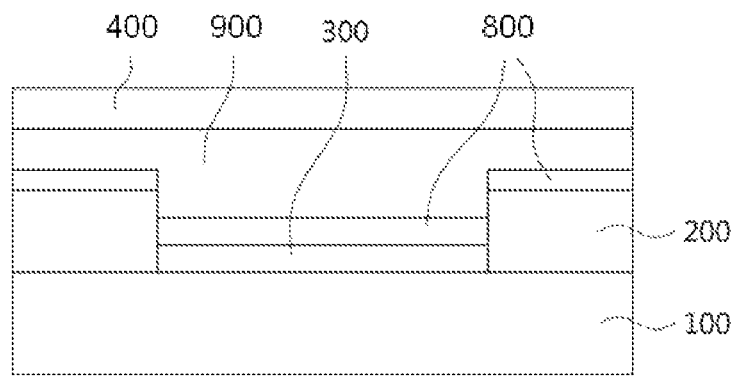

As illustrated in FIG. 37, the window substrate integrated with a polarizing plate of the present invention may further include the retardation layer 400 disposed on the leveling layer 900.

As described above, the display part and the non-display part are planarized by the leveling layer 900, such that a problem, in which some regions of the retardation layer 400 are insufficiently adhered due to the step, may be solved.

The retardation layer 400 may be a single layer or a double layer.

In a case of the single layer, the retardation layer 400 may be a ¼ wavelength plate, while in a case of the double layer, the retardation layer 400 may be a double layer of the ¼ wavelength plate and the ½ wavelength plate, but it is not limited thereto. When the retardation layer 400 is the double layer of the ¼ wavelength plate and the ½ wavelength plate, it is possible to obtain excellent color sense and image quality due to retardation correction when applying to an image display device.

A thickness of the retardation layer 400 is not particularly limited, and may be, for example, 1 to 30 μm. If the thickness thereof is less than 1 μm, it may be difficult to achieve sufficient retardation properties. If the thickness thereof exceeds 30 μm, the entire thickness of the window substrate may be increased to causes a difficulty in reducing a thickness of the image display device.

Figure 38:
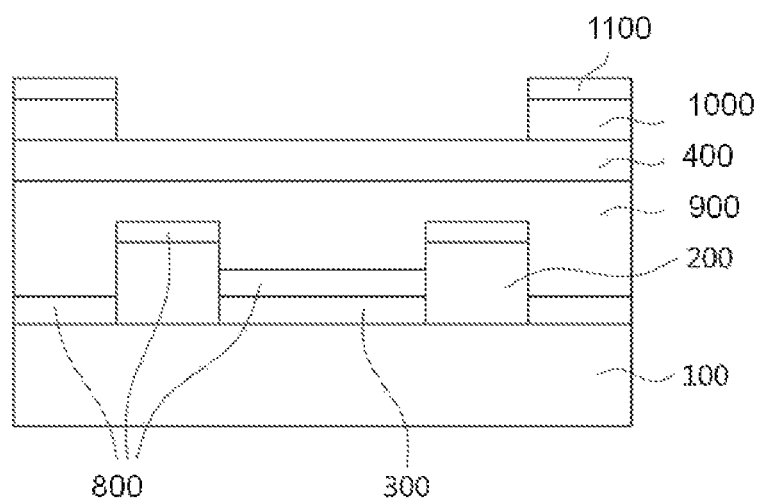

In the window substrate integrated with a polarizing plate according to another embodiment of the present invention, as illustrated in FIG. 38, the non-display pattern 200 may be disposed on at least a portion of the non-display part, and the leveling layer 900 may be further disposed on the remaining region of the non-display part.

An area of the region in which the non-display pattern 200 is formed is not limited so long as the non-display pattern 200 can define the display part and the non-display part, and a width thereof may be freely controlled.

In addition, the leveling layer 900 may be further disposed on the remaining region of the non-display part, in which the non-display pattern 200 is not disposed.

Further, when the non-display pattern 200 is disposed on at least one portion of the non-display part, the aqueous over-coating layer 800 may be disposed on the remaining region of the non-display part, and the leveling layer 900 may also be disposed on the aqueous over-coating layer 800.

As illustrated in FIG. 38, the window substrate integrated with a polarizing plate of the present invention may further include color patterns 1000 on regions corresponding to the leveling layer 900 of the non-display part on the retardation layer 400. That is, the color patterns 1000 are also disposed on the non-display part, and by including the color patterns 1000, the color of the non-display part may be more diversified.

In addition, as illustrated in FIG. 38, the window substrate integrated with a polarizing plate of the present invention may further include shielding patterns 1100 on the color patterns 1000.

The shielding pattern 1100 functions to prevent the lower wiring of the non-display part from being viewed by the user due to light from the display device penetrating the color pattern 1000.

Thicknesses of the color pattern 1000 and the shielding pattern 1100 are not particularly limited, and may be each independently, for example, 1 to 30 µm. If the thickness thereof is less than 1 µm, it may be difficult to achieve sufficient colors or shielding effects. If the thickness thereof exceeds 30 µm, the entire thickness of the window substrate may be increased to causes a difficulty in reducing a thickness of the image display device.

Also, the present invention provides an optical laminate including the above-described window substrate integrated with a polarizing plate.

The optical laminate of the present invention includes the window substrate integrated with a polarizing plate and a touch panel including touch sensors adhered thereto.

The touch panel including the touch sensors may be adhered to a side of the window substrate on which the non-display pattern 200 and the liquid crystal polarizing layer 300 are arranged.

The touch panel including the touch sensors may be adhered using any aqueous or photo-curable adhesive, or a binder known in the related art.

The touch panel including the touch sensors may use any panel including the configuration known in the related art such as a sensing electrode layer, insulation layer, or passivation layer, without particular limitation thereof.

Further, the present invention provides an image display device including the optical laminate.

The optical laminate of the present invention may be applicable to typical liquid crystal display devices, in addition, other different image display devices such as an electro-luminescent display device, plasma display device, electro-luminescent emission display device, or the like.

Furthermore, the present invention provides a method of preparing a window substrate integrated with a polarizing plate.

Figure 4:
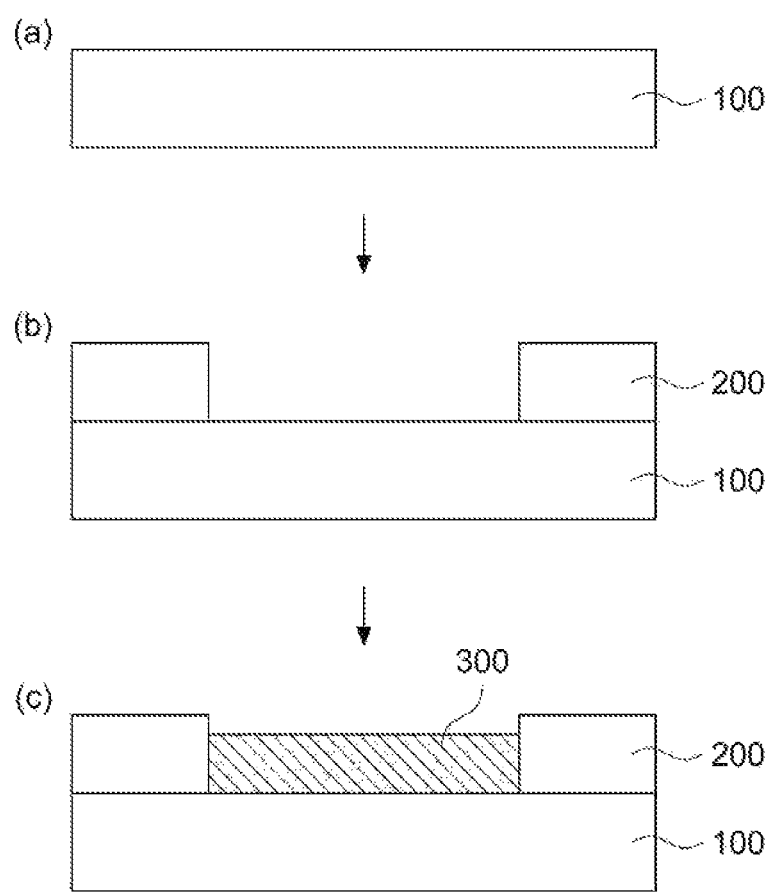
FIGS. 4 to 7 are schematic cross-sectional views illustrating processes of a method of preparing a window substrate integrated with a polarizing plate according to one embodiment of the present invention.

According to one embodiment of the method of preparing a window substrate integrated with a polarizing plate, as illustrated in (b) of FIG. 4, a non-display pattern 200 is formed on one surface of the base substrate 100 to define the display part and the non-display part.

The base substrate 100 may be prepared of any material, which is not particularly limited so long as it has high durability to sufficiently protect a liquid crystal display device, a touch screen panel, and the like, from external forces and allow a user to view the display very well, and any base substrate 100 used in the related art may be adopted without particular limitation thereof. For example, glass, polyethersulfone (PES), polyacrylate (PAR), polyetherimide (PEI), polyethylene naphthalate (PEN), polyethylene terephthalate (PET), polyphenylene sulfide (PPS), polyallylate, polyimide, polycarbonate (PC), cellulose triacetate (TAC), cellulose acetate propionate (CAP), or the like, may be used.

A thickness of the base substrate 100 is not particularly limited, and may be, for example, 10 to 200 µm. If the thickness thereof is less than 10 µm, it is difficult to achieve a sufficient hardness, strength, or the like as a window substrate. If the thickness thereof exceeds 200 µm, an entire thickness of the window substrate may be increased to causes a difficulty in reducing a thickness and weight thereof. The base substrate 100 includes a display part which displays an image when applying to an image display device, and a non-display part which forms a portion of a housing of an electronic device and does not display the image due to being hidden by the non-display pattern 200. For example, the image may be output in the non-display part, but since the image displayed on the non-display part is hidden by the non-display pattern 200, the user may not view the image.

A method of forming the non-display pattern 200 is not particularly limited, and may use any method so long as it can form a pattern by an embossing process. For example, the method of forming the non-display pattern 200 may include physical deposition, chemical deposition, plasma deposition, plasma polymerization, thermal deposition, thermal oxidation, amphoteric oxidation, cluster-ion beam deposition, slit coating, knife coating, spin coating, casting, micro gravure coating, gravure coating, bar coating, roll coating, wire-bar coating, dip coating, spray coating, screen printing, gravure printing, flexo printing, offset printing, ink-jet coating, dispenser printing, nozzle coating, capillary coating, and the like.

The step of forming the non-display pattern 200 may include: forming a first pattern 210 that defines the display part and the non-display part; and forming a second pattern 220 having a light-shielding property that covers the non-display part in which the first pattern 210 is disposed.

The first pattern 210 forms the boundary between the display part and the non-display part, and may be disposed on only edges of the display part and the non-display part, or may be disposed on the entire non-display part.

The first pattern 210 may be transparent or opaque. Even when the first pattern 210 is transparent, since the second pattern 220 has a light-shielding property, there is no problem to prevent the lower wiring from being viewed.

The second pattern 220 is a pattern having a light-shielding property that covers the non-display part in which the first pattern 210 is disposed.

The first pattern 210 and the second pattern 220 may be each independently a single-layered pattern or a double-layered pattern.

When the first pattern 210 or the second pattern 220 is the double-layered pattern, each layer may be each independently transparent or opaque. However, at least one layer of the second pattern 220 may be opaque.

A thickness of the non-display pattern 200 is not particularly limited, and may be, for example, 1 to 100 µm. It is preferable that the non-display pattern 200 has a thickness of the liquid crystal polarizing layer 300 or more in terms of preventing the coating layer from being flown to the non-display part during forming the liquid crystal polarizing layer 300 by coating.

Then, as illustrated in (C) of FIG. 4, a liquid crystal polarizing layer 300 is formed on the display part defined by the non-display pattern 200.

The step of forming the liquid crystal polarizing layer 300 may include: coating an alignment layer 310 and conducting alignment treatment of the alignment layer 310; coating a liquid crystal layer 320 on the alignment layer 310 subjected to the alignment treatment; and curing the liquid crystal layer 320.

A method of coating the alignment layer 310 and the liquid crystal layer 320 is not particularly limited, but may include, for example, slit coating, knife coating, spin coating, casting, micro gravure coating, gravure coating, bar coating, roll coating, wire-bar coating, dip coating, spray coating, screen printing, gravure printing, flexo printing, offset printing, ink-jet coating, dispenser printing, nozzle coating, capillary coating, and the like.

The alignment treatment of the alignment layer 310 may be performed by rubbing the alignment layer 310 using a rubbing roll, for example, but it is not limited thereto, and may be performed by any method known in the related art.

The coated liquid crystal layer 320 may be cured using UV (ultraviolet) rays or heat.

A thickness of the liquid crystal polarizing layer 300 is not particularly limited, and may be, for example, 1 to 30 µm. If the thickness thereof is less than 1 µm, adhesion of the liquid crystal polarizing layer 300 with respect to the base substrate 100 may be insufficient. If the thickness thereof exceeds 30 µm, the entire thickness of the window substrate may be increased to causes a difficulty in reducing a thickness thereof.

Since the display part and the non-display part are defined by the non-display pattern 200, a coating material is not flown to the non-display part during forming the liquid crystal polarizing layer 300 by coating, thereby a loss of the coating material may be prevented, and the liquid crystal polarizing layer 300 may be easily formed on only the display part.

If necessary, the method of preparing a window substrate integrated with a polarizing plate of the present invention may further include adhering a release film 700 that covers the non-display part before forming the liquid crystal polarizing layer 300.

In such a case, the release film 700 covers the non-display part, such that it is possible to more efficiently prevent the liquid crystal polarizing layer 300 from being flown to the non-display part.

The release film 700 may be cut so as to have openings corresponding to the display parts so that the liquid crystal polarizing layer 300 can be formed on the display part, and the openings may be formed by cutting after adhering the release film 700.

More particularly, the release film 700 may be adhered before forming the alignment layer 310 of the liquid crystal polarizing layer 300, or may be adhered after forming the alignment layer 310 and before forming the liquid crystal layer 320.

If necessary, the method of preparing a window substrate integrated with a polarizing plate of the present invention may further include forming a retardation layer 400 on the liquid crystal polarizing layer 300.

The retardation layer 400 may be formed by coating the retardation layer on the liquid crystal polarizing layer 300, or adhering a retardation film thereto.

A method of coating the retardation layer 400 is not particularly limited, but may include, for example, slit coating, knife coating, spin coating, casting, micro gravure coating, gravure coating, bar coating, roll coating, wire-bar coating, dip coating, spray coating, screen printing, gravure printing, flexo printing, offset printing, ink-jet coating, dispenser printing, nozzle coating, capillary coating, and the like.

The retardation layer 400 may be a single layer or a double layer, and in a case of the single layer, the retardation layer may be a ¼ wavelength plate, while in a case of the double layer, the retardation layer may be a ½ wavelength plate, but it is not limited thereto. When the retardation layer is a double layer of the ¼ wavelength plate and the ½ wavelength plate, it is possible to obtain excellent color sense and image quality due to retardation correction when applying to an image display device.

A thickness of the retardation layer 400 is not particularly limited, and may be, for example, 1 to 100 µm. If the thickness thereof is less than 1 µm, retardation properties may be decreased. If the thickness thereof exceeds 100 µm, the entire thickness of the window substrate may be increased to causes a difficulty in reducing a thickness thereof.

The method of preparing a window substrate integrated with a polarizing plate of the present invention may further include forming a refractive index control layer 500 on the retardation layer 400.

The refractive index control layer 500 may be formed by coating the refractive index control layer 500 on the retardation layer 400, or adhering a refractive index control film thereto.

A method of coating the refractive index control layer 500 is not particularly limited, but may include, for example, slit coating, knife coating, spin coating, casting, micro gravure coating, gravure coating, bar coating, roll coating, wire-bar coating, dip coating, spray coating, screen printing, gravure printing, flexo printing, offset printing, ink-jet coating, dispenser printing, nozzle coating, capillary coating, and the like.

The refractive index control layer 500 is a layer for adjusting a refractive index to improve the color sense when applying to an image display device.

The refractive index control layer 500 may be a coating layer or a film. For example, the refractive index control layer 500 may use an elongated film type or liquid crystal coating type C-plate.

A thickness of the refractive index control layer 500 is not particularly limited, and may be, for example, 1 to 30 µm. If the thickness thereof is less than 1 µm, retardation properties may be decreased. If the thickness thereof exceeds 30 µm, the entire thickness of the window substrate may be increased to causes a difficulty in reducing a thickness of the image display device.

According to another embodiment of the present invention, the method of preparing a window substrate integrated with a polarizing plate of the present invention may include: forming a non-display pattern on one surface of the base substrate to define the display part and the non-display part; and forming a liquid crystal polarizing layer on the display part defined by the non-display pattern; and in addition, forming an aqueous over-coating layer on the liquid crystal polarizing layer; and forming a leveling layer on the over-coating layer to planarize the display part and the non-display part.

Hereinafter, the additional steps will be described.

Figure 39:
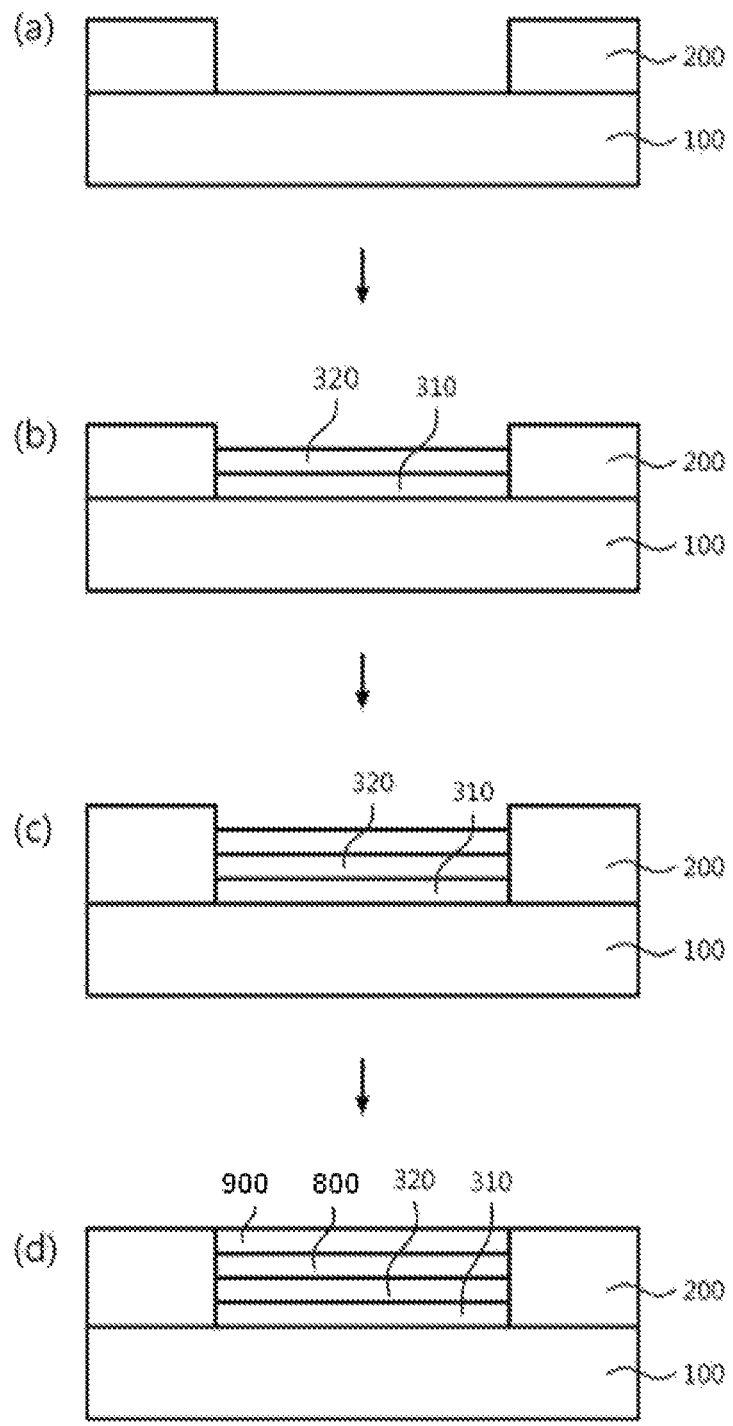
FIGS. 39 to 40 are schematic cross-sectional views illustrating processes of a method of preparing a window substrate integrated with a polarizing plate according to some embodiments of the present invention.

First, as illustrated in (c) of FIG. 39, the aqueous over-coating layer 800 is formed on the liquid crystal polarizing layer 300.

A method of forming the over-coating layer 800 is not particularly limited, but may include, for example, slit coating, knife coating, spin coating, casting, micro gravure coating, gravure coating, bar coating, roll coating, wire-bar coating, dip coating, spray coating, screen printing, gravure printing, flexo printing, offset printing, ink-jet coating, dispenser printing, nozzle coating, capillary coating, and the like.

Figure 40:
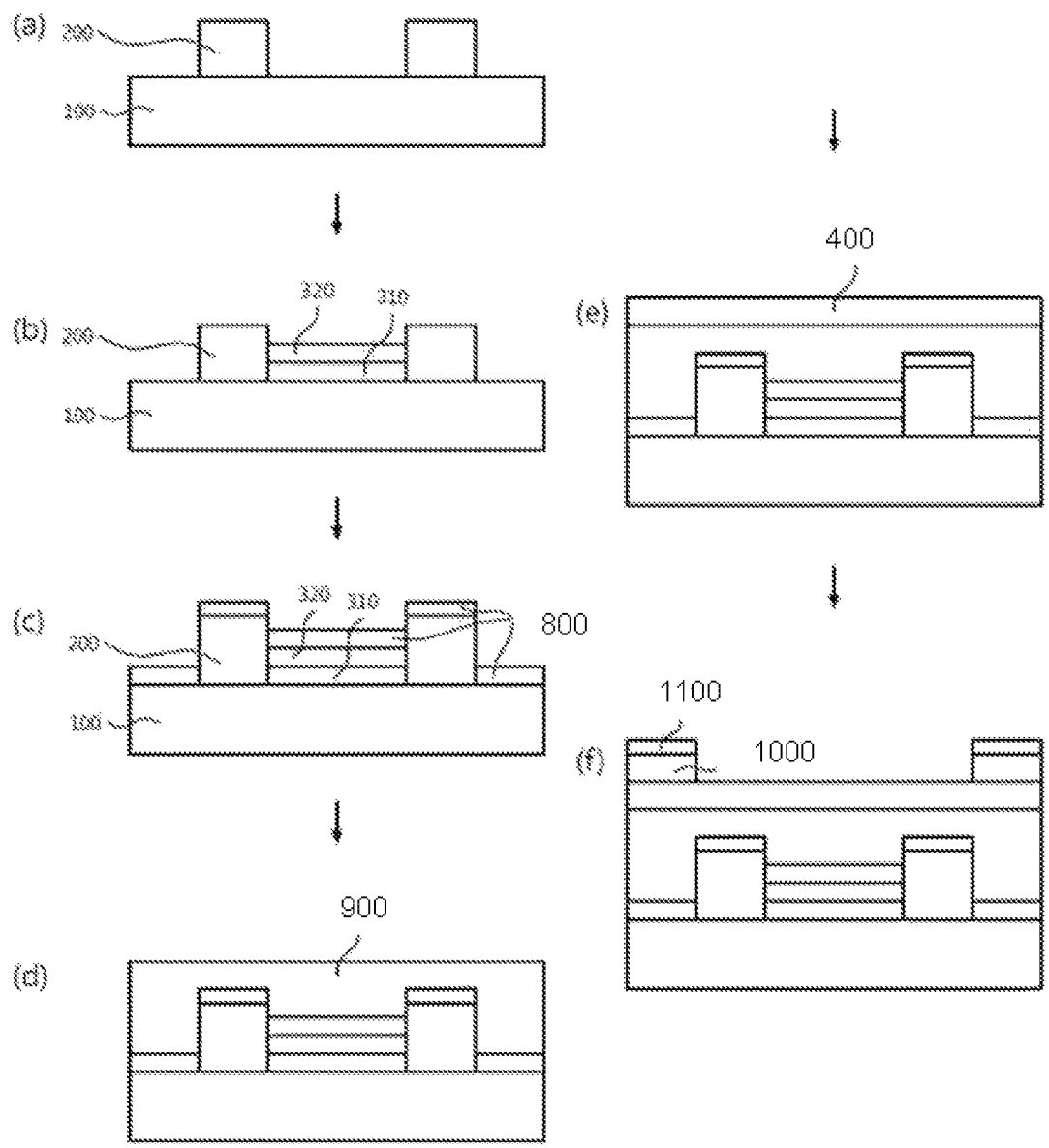

As illustrated in (c) of FIG. 40, the aqueous over-coating layer 800 may be formed on the liquid crystal polarizing layer 300, as well as on the non-display pattern 200.

A thickness of the aqueous over-coating layer 800 is not particularly limited, and may be, for example, 1 to 30 µm.

Next, as illustrated in (d) of FIG. 39, a leveling layer 900 may be formed on the over-coating layer to planarize the display part and the non-display part.

The polarizing plate is adhered to an entire one surface of the window substrate according to the conventional method, or the liquid crystal polarizing layer 300 is formed, then the retardation layer 400 is formed, and the non-display pattern 200 is formed, and only in these cases, there is no problem when forming the retardation layer 400.

However, if the non-display pattern 200 is formed on the non-display part and the liquid crystal polarizing layer 300 is formed on the display part according to the method of the present invention, then the retardation layer 400 is formed on the liquid crystal polarizing layer 300, a step between the display part and the non-display part may occur to cause a decrease in reliability of coating or adhering of the retardation layer 400. In addition, the step may be more increased due to forming of the over-coating layer.

However, in the method of preparing a window substrate integrated with a polarizing plate of the present invention, the leveling layer 900 is formed on the over-coating layer to planarize the display part and the non-display part, such that the above-described problem may be solved, and thereby color non-display pattern 200 may be achieved without a decrease in the reliability of coating or adhering of the retardation layer 400.

The leveling layer 900 may be made of a composition for forming the leveling layer 900 including an organic binder resin, organic solvent, etc. known in the related art.

A method of forming the leveling layer 900 is not particularly limited, but may include, for example, slit coating, knife coating, spin coating, casting, micro gravure coating, gravure coating, bar coating, roll coating, wire-bar coating, dip coating, spray coating, screen printing, gravure printing, flexo printing, offset printing, ink-jet coating, dispenser printing, nozzle coating, capillary coating, and the like.

As illustrated in (d) of FIG. 39, the leveling layer 900 is disposed on the aqueous over-coating layer 800 to eliminate the step between the aqueous over-coating layer 800 and the non-display pattern 200, and thereby planarizing the display part and the non-display part.

In addition, when the over-coating layer is disposed on the liquid crystal polarizing layer 300 and the non-display pattern 200, as illustrated in (d) FIG. 40, the leveling layer 900 may planarize the display part and the non-display part.

A thickness of the leveling layer 900 is not particularly limited, and may be, for example, 1 to 30 μm. In addition, the method of preparing a window substrate integrated with a polarizing plate of the present invention may further include forming the retardation layer 400 on the leveling layer 900, as illustrated in (e) of FIG. 40.

The retardation layer 400 may be a coating layer or a film.

When the retardation layer 400 is a film, it may be adhered using any aqueous or photo-curable adhesive, or a binder known in the related art.

The retardation layer 400 may be a single layer or a double layer.

In a case of the single layer, the retardation layer may be a ¼ wavelength plate, while in a case of the double layer, the retardation layer may be a ½ wavelength plate, but it is not limited thereto. When the retardation layer is a double layer of the ¼ wavelength plate and the ½ wavelength plate, it is possible to obtain excellent color sense and image quality due to retardation correction when applying to an image display device.

A thickness of the retardation layer 400 is not particularly limited, and may be, for example, 1 to 30 μm.

According to another embodiment of the method of preparing a window substrate integrated with a polarizing plate, as illustrated in (b) of FIG. 40, the non-display pattern 200 may be formed on at least a portion of the non-display part, and as illustrated in (d) of FIG. 40, the leveling layer 900 may be further formed on the remaining region of the non-display part.

An area of the region in which the non-display pattern 200 is formed is not limited so long as the non-display pattern 200 can define the display part and the non-display part, and a width thereof may be freely controlled. In addition, the leveling layer 900 may be further disposed on the remaining region of the non-display part, in which the non-display pattern 200 is not disposed, which may be formed together with the above-described process of forming of the leveling layer 900 on the liquid crystal polarizing layer 300.

In such a case, as illustrated in (f) of FIG. 40, the method of forming a window substrate integrated with a polarizing plate of the present invention may further include forming color patterns 1000 on regions corresponding to the leveling layer 900 of the non-display part on the retardation layer 400.

In addition, the method of preparing a window substrate integrated with a polarizing plate of the present invention may further include forming shielding patterns 1100 on the color pattern 1000s, as illustrated in (f) of FIG. 40.

A method of forming the color pattern 1000 and the shielding pattern 1100 is not particularly limited, but may include, for example, slit coating, knife coating, spin coating, casting, micro gravure coating, gravure coating, bar coating, roll coating, wire-bar coating, dip coating, spray coating, screen printing, gravure printing, flexo printing, offset printing, ink-jet coating, dispenser printing, nozzle coating, capillary coating, and the like.

Thicknesses of the color pattern 1000 and the shielding pattern 1100 are not particularly limited, and may be each independently, for example, 1 to 30 μm.

Figure 5:
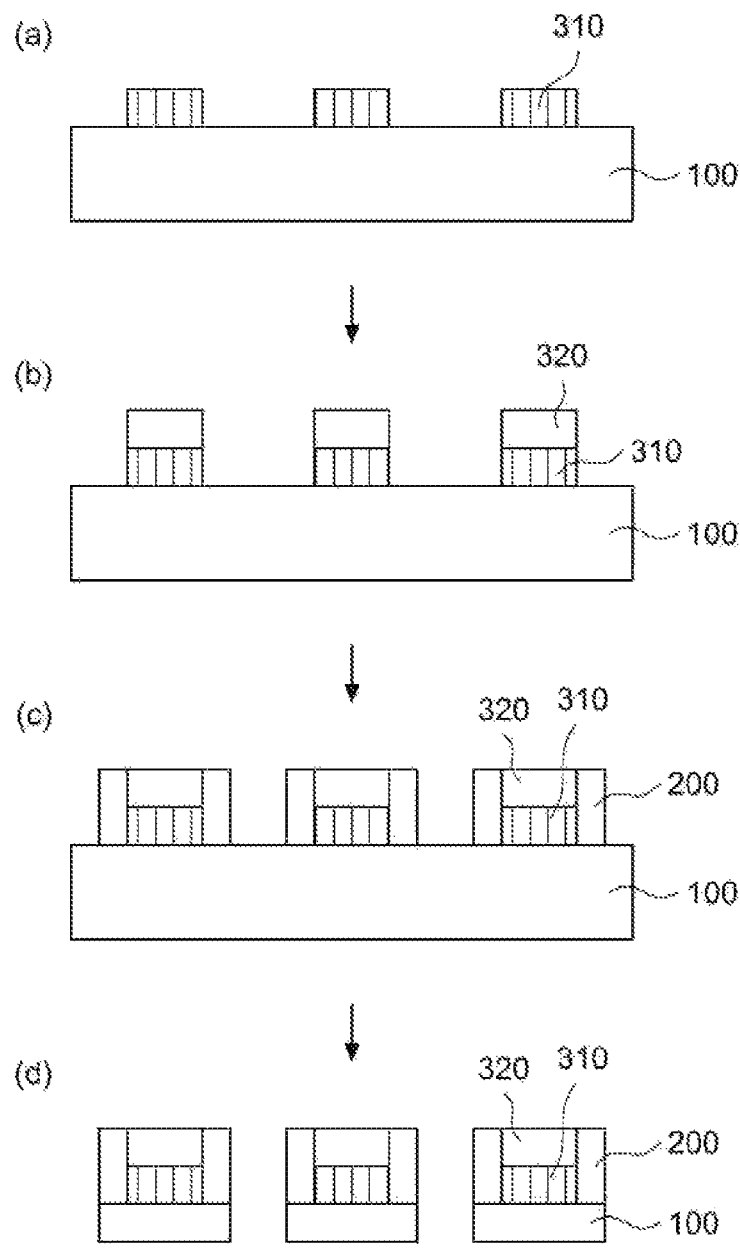
Figure 6:
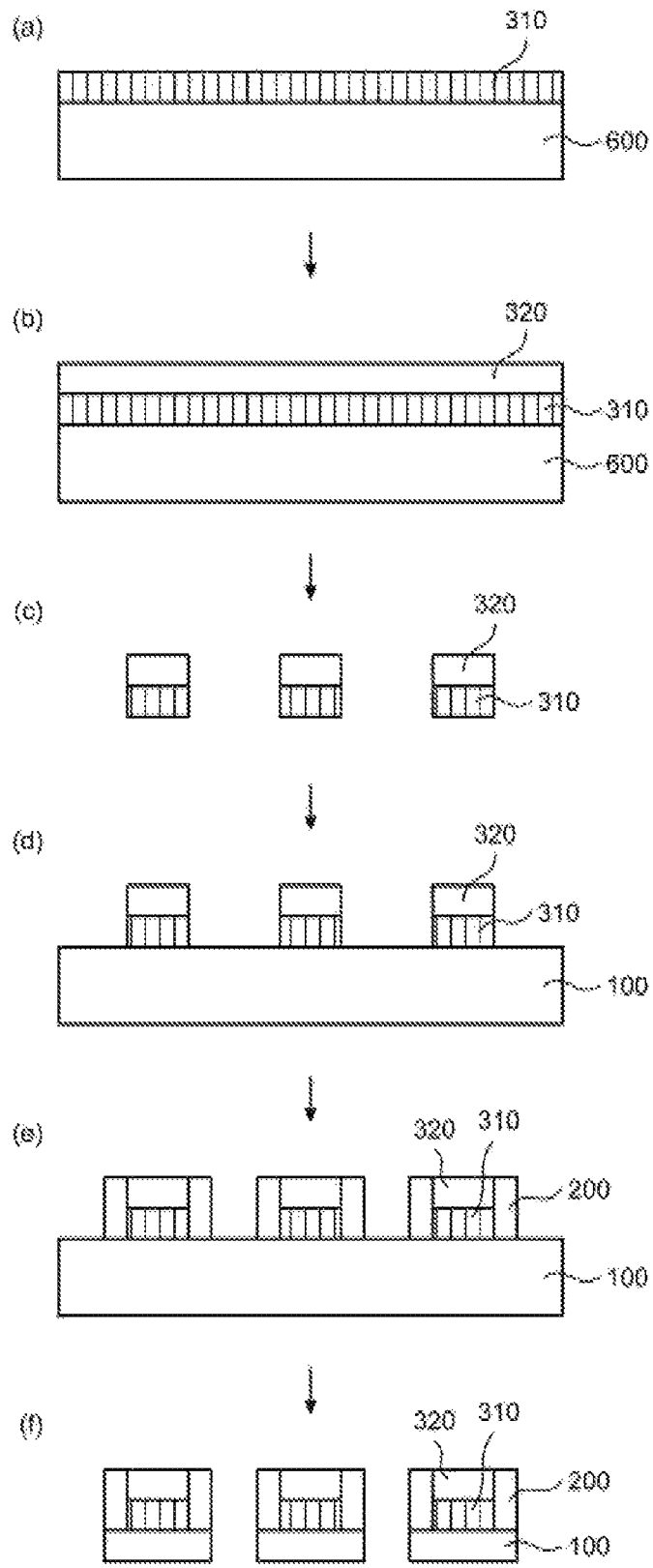
Figure 7:
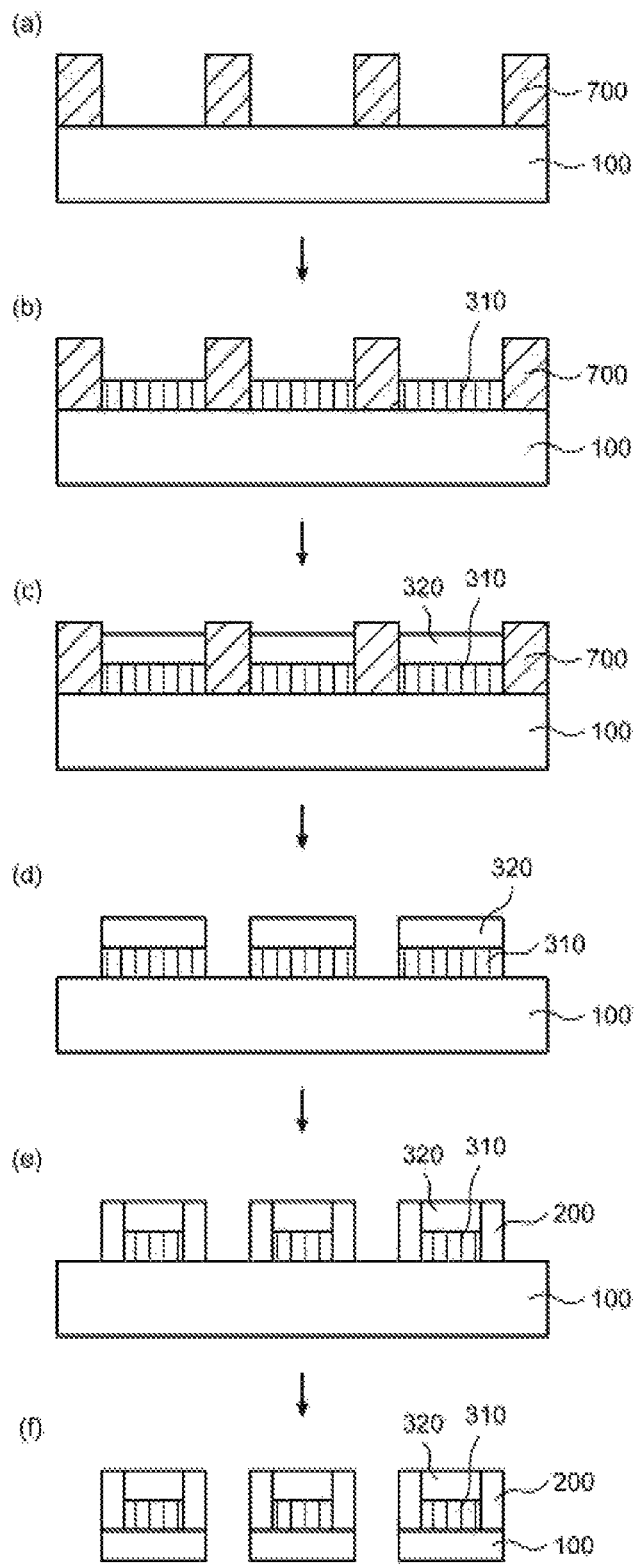

In addition, in the method of preparing a window substrate integrated with a polarizing plate of the present invention, as illustrated in FIGS. 5 to 7, the base substrate 100 is a mother substrate including a plurality of unit cells, and each step may be performed for each unit cell.

The unit cell means a region applied to an individual product in the base substrate 100.

The method of preparing a window substrate integrated with a polarizing plate of the present invention may be performed on the base substrate 100 having an individual product size, or may be performed on the mother substrate including the plurality of unit cells for each unit cell, but the latter provides a more excellent process yield.

In such a case, the above-described steps may be performed for each unit cell, and the base substrate 100 may be cut for each unit cell, thus to prepare a plurality of window substrates integrated with a polarizing plate.

FIGS. 9 to 20 are schematic views illustrating processes of a method of preparing a window substrate integrated with a polarizing plate according to various embodiments of the present invention, which includes: forming a non-display pattern 200 on one surface of the base substrate 100 to define the display part and the non-display part; and forming a liquid crystal polarizing layer 300 on the display part defined by the non-display pattern 200; forming a retardation layer 400 on the liquid crystal polarizing layer 300; and forming a refractive index control layer 500 on the retardation layer 400.

As illustrated in FIGS. 9 to 20, the non-display pattern 200 is formed on one surface of the base substrate 100 to define the display part and the non-display part, then the liquid crystal polarizing layer 300 is formed on the display part.

When forming the non-display pattern 200 by including: forming a first pattern 210 that defines the display part and the non-display part; and forming a second pattern 220 having shielding properties that covers the non-display part in which the first pattern 210 is disposed, the second step of forming the second pattern 220 may be performed directly after the first step of forming the first pattern 210, or otherwise, after forming only the first pattern 210, the liquid crystal polarizing layer 300, the retardation layer 400 or the refractive index control layer 500 may be formed, then the second step may be performed.

FIGS. 9 to 20 illustrate a case of adhering the release film 700 that covers the non-display part before forming the liquid crystal polarizing layer 300, but it is not limited thereto, and the liquid crystal polarizing layer 300 may be formed without the release film 700. FIGS. 9 to 14 illustrate a case of forming the openings by cutting after adhering the release film 700, while FIGS. 15 to 20 illustrate a case of adhering the release film 700 having the openings so as expose the display part.

When the release film 700 is adhered, as illustrated in FIGS. 9 to 11, and 15 to 17, the liquid crystal polarizing layer 300 may be formed on the entire one surface of the base substrate 100, and as illustrated in FIGS. 12 to 14, and 18 to 20, may be formed on only the display part.

Thereafter, the retardation layer 400 is formed on the liquid crystal polarizing layer 300, then the refractive index control layer 500 is formed on the retardation layer 400.

A peeling-off time of the release film 700 is not particularly limited, and the release film 700 may be peeled-off, for example, after forming the liquid crystal polarizing layer 300, after forming the retardation layer 400, or after forming the refractive index control layer 500.

Figure 21:
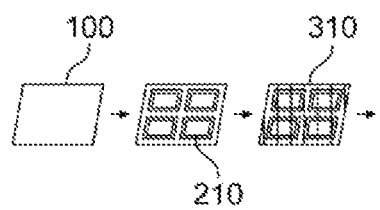

In addition, FIG. 21 illustrates another embodiment of the method of preparing a window substrate integrated with a polarizing plate of the present invention including the above-described steps.

FIG. 21 illustrates from a process of forming the non-display pattern 200 to a process of forming the alignment layer 310 of the liquid crystal polarizing layer 300, and then, the process may be performed from the process of adhering the release film 700 of FIGS. 9 to 20. However, the alignment layer 310 is already formed, such that, in the process of forming the liquid crystal polarizing layer, only the liquid crystal layer 320 is further formed. As such, when forming the liquid crystal polarizing layer 300, adhering the release film 700 may also be further performed in the process of forming the liquid crystal layer 320.

Further, the present invention provides a method of preparing a window substrate integrated with a polarizing plate according to another embodiment.

First, as illustrated in (a) and (b) of FIG. 5, the liquid crystal polarizing layer 300 is formed on the display part of one surface of the base substrate 100.

FIG. 5 illustrates a case of performing the process on the mother substrate including a plurality of unit cells for each unit cell, but it is not limited thereto, and the process may be performed on the base substrate 100 having one unit cell size of an individual product.

The base substrate 100 may be prepared of any material, which is not particularly limited so long as it has high durability to sufficiently protect a liquid crystal display device, a touch screen panel, and the like, from external forces and allow a user to view the display very well, and any base substrate 100 used in the related art may be adopted without particular limitation thereof. For example, glass, polyethersulfone (PES), polyacrylate (PAR), polyetherimide (PEI), polyethylene naphthalate (PEN), polyethylene terephthalate (PET), polyphenylene sulfide (PPS), polyallylate, polyimide, polycarbonate (PC), cellulose triacetate (TAC), cellulose acetate propionate (CAP), or the like, may be used.

A thickness of the base substrate 100 is not particularly limited, and may be, for example, 10 to 200 μm. If the thickness thereof is less than 10 μm, it is difficult to achieve a sufficient hardness, strength, or the like as a window substrate. If the thickness thereof exceeds 200 μm, an entire thickness of the window substrate may be increased to causes a difficulty in reducing a thickness and weight thereof.

The base substrate 100 includes a display part which displays an image when applying to an image display device, and a non-display part which forms a portion of a housing of an electronic device and does not display the image due to being hidden by the non-display pattern 200. For example, the image may be output in the non-display part, but since the image displayed on the non-display part is hidden by the non-display pattern 200, the user may not view the image.

The step of forming the liquid crystal polarizing layer 300 may include: coating an alignment layer 310 and conducting alignment treatment of the alignment layer 310; coating a liquid crystal layer 320 on the alignment layer 310 subjected to the alignment treatment; and curing the liquid crystal layer 320.

A method of coating the alignment layer 310 and the liquid crystal layer 320 is not particularly limited, but may include, for example, slit coating, knife coating, spin coating, casting, micro gravure coating, gravure coating, bar coating, roll coating, wire-bar coating, dip coating, spray coating, screen printing, gravure printing, flexo printing, offset printing, ink-jet coating, dispenser printing, nozzle coating, capillary coating, and the like.

The alignment treatment of the alignment layer 310 may be performed by rubbing the alignment layer 310 using a rubbing roll, for example, but it is not limited thereto, and may be performed by any method known in the related art.

The coated liquid crystal layer 320 may be cured using UV rays or heat.

A thickness of the liquid crystal polarizing layer 300 is not particularly limited, and may be, for example, 1 to 30 μm. If the thickness thereof is less than 1 μm, adhesion of the liquid crystal polarizing layer 300 with respect to the base substrate 100 may be insufficient. If the thickness thereof exceeds 30 μm, the entire thickness of the window substrate may be increased to causes a difficulty in reducing a thickness thereof.

If necessary, the method of preparing a window substrate integrated with a polarizing plate of the present invention may further include adhering a release film 700 to cover the non-display part before forming the liquid crystal layer 320. In such a case, the release film 700 covers the non-display part, such that it is possible to more efficiently prevent the liquid crystal layer 320 from being flown to the non-display part.

The release film 700 may be cut so as to have openings corresponding to the display parts so that the liquid crystal layer 320 may be formed on the alignment layer 310, and the openings may be formed by cutting after adhering the release film 700.

If necessary, the method of preparing a window substrate integrated with a polarizing plate of the present invention may further include forming the retardation layer 400 on the liquid crystal polarizing layer 300, and in addition, forming a refractive index control layer 500 on the retardation layer 400.

The retardation layer 400 may be formed by coating a retardation layer on the liquid crystal polarizing layer 300, or by adhering a retardation film thereto.

A method of coating the retardation layer 400 is not particularly limited, but may include, for example, slit coating, knife coating, spin coating, casting, micro gravure coating, gravure coating, bar coating, roll coating, wire-bar coating, dip coating, spray coating, screen printing, gravure printing, flexo printing, offset printing, ink-jet coating, dispenser printing, nozzle coating, capillary coating, and the like.

The retardation layer 400 may be a single layer or a double layer, and in a case of the single layer, the retardation layer may be a ¼ wavelength plate, while in a case of the double layer, the retardation layer may be a ½ wavelength plate, but it is not limited thereto. When the retardation layer is a double layer of the ¼ wavelength plate and the ½ wavelength plate, it is possible to obtain excellent color sense and image quality due to retardation correction when applying to an image display device.

A thickness of the retardation layer 400 is not particularly limited, and may be, for example, 1 to 100 μm. If the thickness thereof is less than 1 μm, retardation properties may be decreased. If the thickness thereof exceeds 100 μm, the entire thickness of the window substrate may be increased to causes a difficulty in reducing a thickness thereof.

The refractive index control layer 500 may be formed by coating the refractive index control layer 500 on the retardation layer 400, or adhering a refractive index control film thereto.

A method of coating the refractive index control layer 500 is not particularly limited, but may include, for example, slit coating, knife coating, spin coating, casting, micro gravure coating, gravure coating, bar coating, roll coating, wire-bar coating, dip coating, spray coating, screen printing, gravure printing, flexo printing, offset printing, ink-jet coating, dispenser printing, nozzle coating, capillary coating, and the like.

The refractive index control layer 500 is a layer that serves to improve the color sense by controlling a refractive index when applying to the image display device.

The refractive index control layer 500 may be a coating layer or a film. For example, the refractive index control layer 500 may use an elongated film type or liquid crystal coating type C-plate.

A thickness of the refractive index control layer 500 is not particularly limited, and may be, for example, 1 to 30 μm. If the thickness thereof is less than 1 μm, retardation properties may be decreased. If the thickness thereof exceeds 30 μm, the entire thickness of the window substrate may be increased to causes a difficulty in reducing a thickness of the image display device.

Forming of the liquid crystal polarizing layer 300 may be performed, as illustrated in FIG. 5, before forming the non-display pattern 200, and may be performed after forming the non-display pattern 200.

In addition, according to the process illustrated in FIG. 5, after forming the liquid crystal polarizing layer 300, the non-display pattern 200 is formed, then the process of forming the retardation layer 400 and the refractive index control layer 500 may be performed, but it is not limited thereto, and forming of the non-display pattern 200 may be performed after forming the liquid crystal polarizing layer 300, the retardation layer 400 and the refractive index control layer 500.

Then, as illustrated in (c) of FIG. 5, the non-display pattern 200 is formed on the non-display part of the one surface of the base substrate 100.

The non-display pattern 200 may be formed in a single layer or a double layer by the above-described method, and may have a thickness within the above-described range.

The part (c) of FIG. 5 illustrates a case of forming the non-display pattern 200 after forming the liquid crystal polarizing layer 300, but it is not limited thereto, and the non-display pattern 200 may be formed after forming the alignment layer 310, and before forming the liquid crystal layer 320.

Further, as illustrated in (d) of FIG. 5, when performing the process on the mother substrate including a plurality of unit cells for each unit cell, the base substrate 100 may be cut for each unit cell.

Thereby, it is possible to obtain a window substrate integrated with a polarizing plate having the number corresponding to the number of the unit cells.

Figure 22:
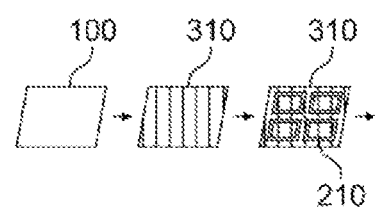
Figure 23:
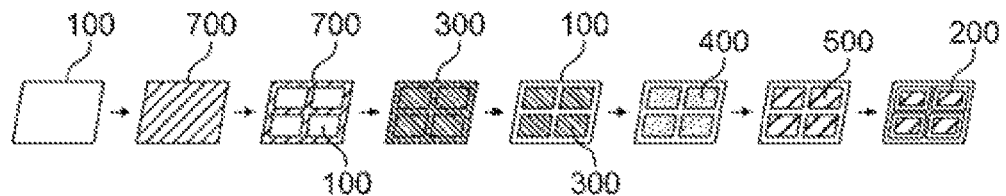
Figure 24:
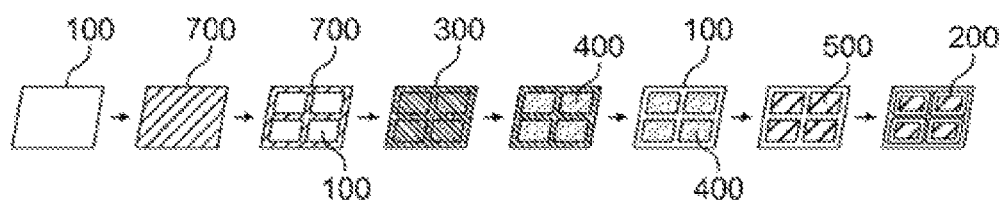
Figure 25:
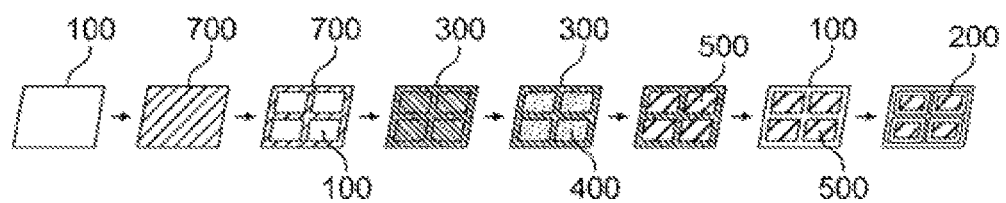
Figure 26:
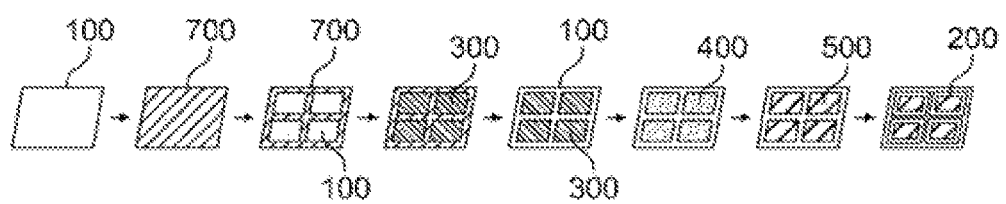
Figure 27:
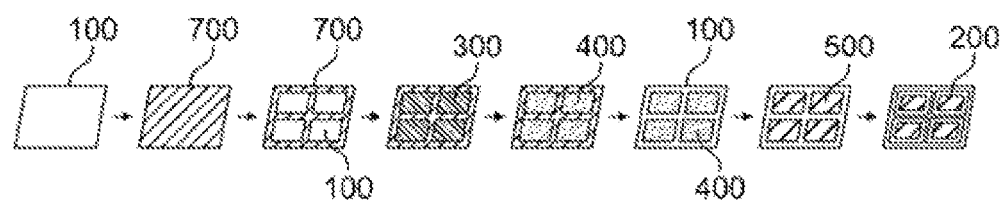
Figure 28:
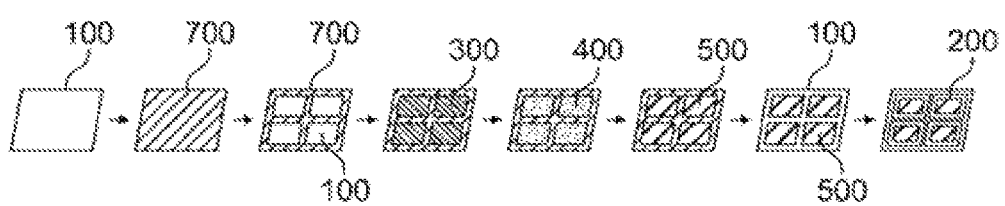
Figure 29:
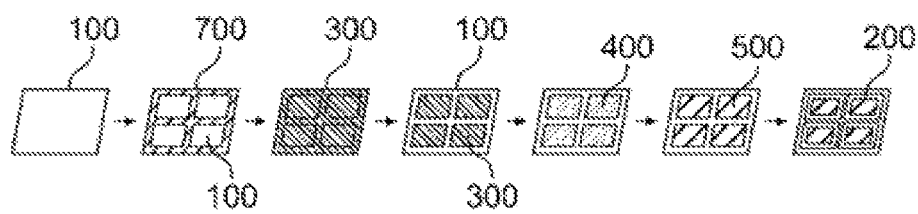
Figure 30:
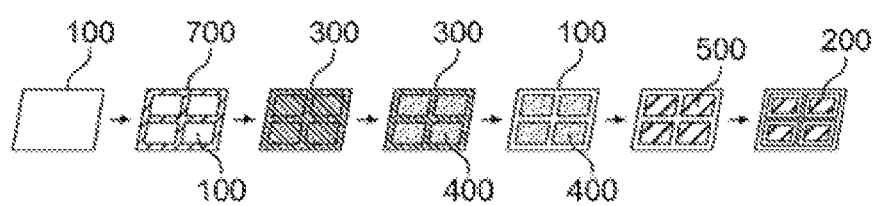
Figure 31:
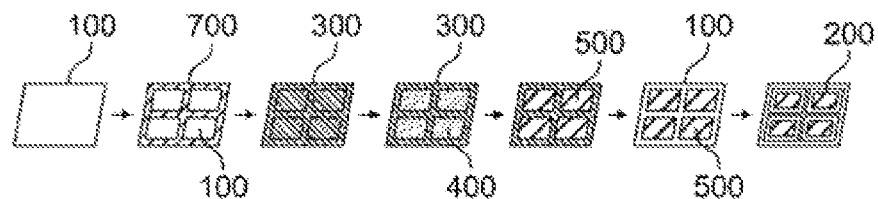
Figure 32:
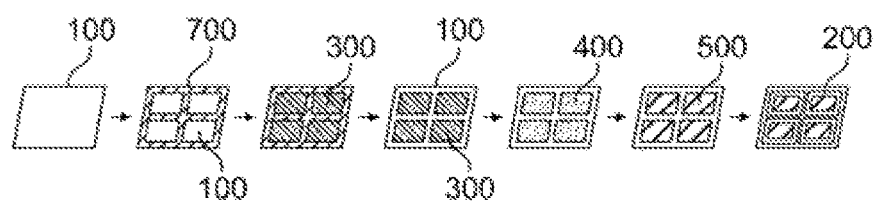
Figure 33:
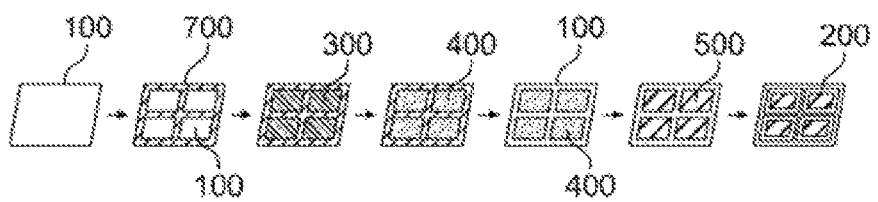
Figure 34:
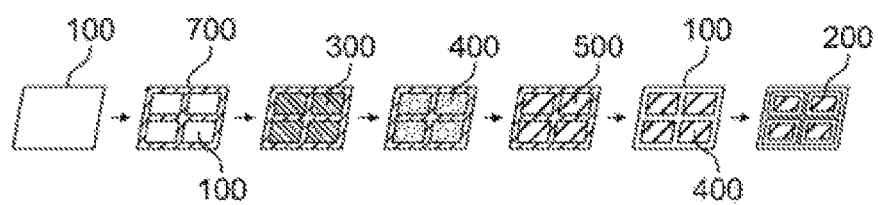

FIG. 22 is a schematic view illustrating processes of a method of preparing a window substrate integrated with a polarizing plate according to another embodiment of the present invention, which includes: forming a liquid crystal polarizing layer 300 on the display part of one surface of the base substrate 100; forming a retardation layer 400 on the liquid crystal polarizing layer 300; and forming a non-display pattern 200 on the non-display part of the one surface of the base substrate 100.

FIG. 22 illustrates a case of performing to a process of forming the alignment layer 310 of the liquid crystal polarizing layer 300 on the one surface of the base substrate 100, and then, the process may be performed from the process of adhering the release film 700 of FIGS. 9 to 20. However, the alignment layer 310 is already formed, such that, in the process of forming the liquid crystal polarizing layer of FIGS. 9 to 20, only the liquid crystal layer 320 is further formed. As such, when forming the liquid crystal polarizing layer 300, adhering the release film 700 may also be further performed in the process of forming the liquid crystal layer 320.

Further, the present invention provides a method of preparing a window substrate integrated with a polarizing plate according to another embodiment.

First, as illustrated in (a) and (b) of FIG. 6, the liquid crystal polarizing layer 300 is formed on one surface of a carrier film 600.

The carrier film 600 is a layer for forming the liquid crystal polarizing layer 300, and is peeled-off according to a subsequent process to be described below, so as not to be included in the configuration of the window substrate integrated with a polarizing plate.

The step of forming the liquid crystal polarizing layer 300 may include: coating an alignment layer 310 and conducting alignment treatment of the alignment layer 310; coating a liquid crystal layer 320 on the alignment layer 310 subjected to the alignment treatment; and curing the liquid crystal layer 320.

A method of coating the alignment layer 310 and the liquid crystal layer 320 is not particularly limited, but may include, for example, slit coating, knife coating, spin coating, casting, micro gravure coating, gravure coating, bar coating, roll coating, wire-bar coating, dip coating, spray coating, screen printing, gravure printing, flexo printing, offset printing, ink-jet coating, dispenser printing, nozzle coating, capillary coating, and the like.

The alignment treatment of the alignment layer 310 may be performed by rubbing the alignment layer 310 using a rubbing roll, for example, but it is not limited thereto, and may be performed by any method known in the related art.

The coated liquid crystal layer 320 may be cured using UV rays or heat.

A thickness of the liquid crystal polarizing layer 300 is not particularly limited, and may be, for example, 1 to 30 μm. If the thickness thereof is less than 1 μm, adhesion of the liquid crystal polarizing layer 300 with respect to the base substrate 100 may be insufficient. If the thickness thereof exceeds 30 μm, the entire thickness of the window substrate may be increased to causes a difficulty in reducing a thickness thereof.

Then, as illustrated in (c) and (d) FIG. 6, the liquid crystal polarizing layer 300 is peeled-off from the carrier film 600, and is adhered to the display part of the one surface of the base substrate 100.

The base substrate 100 may be prepared of any material, which is not particularly limited so long as it has high durability to sufficiently protect a liquid crystal display device, a touch screen panel, and the like, from external forces and allow a user to view the display very well, and any base substrate 100 used in the related art may be adopted without particular limitation thereof. For example, glass, polyethersulfone (PES), polyacrylate (PAR), polyetherimide (PEI), polyethylene naphthalate (PEN), polyethylene terephthalate (PET), polyphenylene sulfide (PPS), polyallylate, polyimide, polycarbonate (PC), cellulose triacetate (TAC), cellulose acetate propionate (CAP), or the like, may be used.

A thickness of the base substrate 100 is not particularly limited, and may be, for example, 10 to 200 μm. If the thickness thereof is less than 10 μm, it is difficult to achieve a sufficient hardness, strength, or the like as a window substrate. If the thickness thereof exceeds 200 μm, an entire thickness of the window substrate may be increased to causes a difficulty in reducing a thickness and weight thereof.

The base substrate 100 includes a display part which displays an image when applying to an image display device, and a non-display part which forms a portion of a housing of an electronic device and does not display the image due to being hidden by the non-display pattern 200. For example, the image may be output in the non-display part, but since the image displayed on the non-display part is hidden by the non-display pattern 200, the user may not view the image.

FIG. 6 illustrates a case of performing a process on the mother substrate including a plurality of unit cells for each unit cell, such that, the liquid crystal polarizing layer 300 is cut in a display part size of the individual unit cell and is adhered to the base substrate 100. But it is not limited thereto, the process may be performed on the base substrate 100 having one unit cell size of an individual product.

The liquid crystal polarizing layer 300 may be adhered using any aqueous or photo-curable adhesive, or a binder known in the related art.

If necessary, the method of preparing a window substrate integrated with a polarizing plate of the present invention may further include forming a retardation layer 400 on the liquid crystal polarizing layer 300, and in addition, forming a refractive index control layer 500 on the retardation layer 400.

The retardation layer 400 may be formed by coating the retardation layer on the liquid crystal polarizing layer 300, or adhering a retardation film thereto.

A method of coating the retardation layer 400 is not particularly limited, but may include, for example, slit coating, knife coating, spin coating, casting, micro gravure coating, gravure coating, bar coating, roll coating, wire-bar coating, dip coating, spray coating, screen printing, gravure printing, flexo printing, offset printing, ink-jet coating, dispenser printing, nozzle coating, capillary coating, and the like.

The retardation layer 400 may be a single layer or a double layer, and in a case of the single layer, the retardation layer may be a ¼ wavelength plate, while in a case of the double layer, the retardation layer may be a ½ wavelength plate, but it is not limited thereto. When the retardation layer is a double layer of the ¼ wavelength plate and the ½ wavelength plate, it is possible to obtain excellent color sense and image quality due to retardation correction when applying to an image display device.

A thickness of the retardation layer 400 is not particularly limited, and may be, for example, 1 to 100 μm. If the thickness thereof is less than 1 μm, retardation properties may be decreased. If the thickness thereof exceeds 100 μm, the entire thickness of the window substrate may be increased to causes a difficulty in reducing a thickness thereof.

The refractive index control layer 500 may be formed by coating the refractive index control layer 500 on the retardation layer 400, or adhering a refractive index control film thereto.

A method of coating the refractive index control layer 500 is not particularly limited, but may include, for example, slit coating, knife coating, spin coating, casting, micro gravure coating, gravure coating, bar coating, roll coating, wire-bar coating, dip coating, spray coating, screen printing, gravure printing, flexo printing, offset printing, ink-jet coating, dispenser printing, nozzle coating, capillary coating, and the like.

The refractive index control layer 500 is a layer that serves to improve the color sense by controlling a refractive index when applying to the image display device.

The refractive index control layer 500 may be a coating layer or a film. For example, the refractive index control layer 500 may use an elongated film type or liquid crystal coating type C-plate.

A thickness of the refractive index control layer 500 is not particularly limited, and may be, for example, 1 to 30 μm. If the thickness thereof is less than 1 μm, retardation properties may be decreased. If the thickness thereof exceeds 30 μm, the entire thickness of the window substrate may be increased to causes a difficulty in reducing a thickness of the image display device.

Forming of the retardation layer 400 and the refractive index control layer 500 may be performed, as illustrated in FIG. 6, before forming the non-display pattern 200, and may be performed after forming the non-display pattern 200.

Then, as illustrated in (e) of FIG. 6, the non-display pattern 200 is formed on the non-display part of the one surface of the base substrate 100.

The non-display pattern 200 may be formed in a single layer or a double layer by the above-described method, and may have a thickness within the above-described range.

Further, as illustrated in (f) of FIG. 6, when performing the process on the mother substrate including a plurality of unit cells for each unit cell, the base substrate 100 may be cut for each unit cell.

Thereby, it is possible to obtain a window substrate integrated with a polarizing plate having the number corresponding to the number of the unit cells.

Further, the present invention provides a method of preparing a window substrate integrated with a polarizing plate according to another embodiment.

Figure 8:
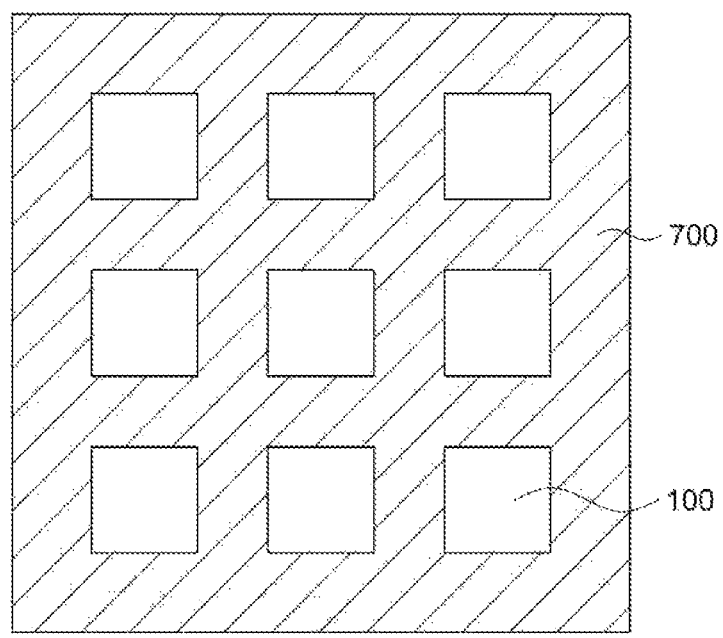
FIG. 8 is a plan view illustrating a base substrate adhered to one surface of a release film having openings corresponding to display parts according to one embodiment of the present invention.
Figure 9:
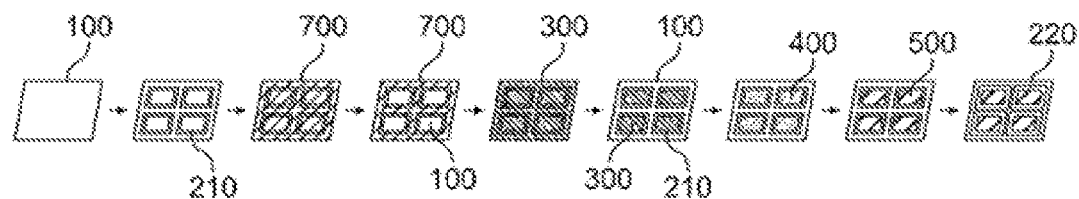
FIGS. 9 to 34 are schematic views illustrating processes of a method of preparing a window substrate integrated with a polarizing plate according to some embodiments of the present invention.
Figure 10:
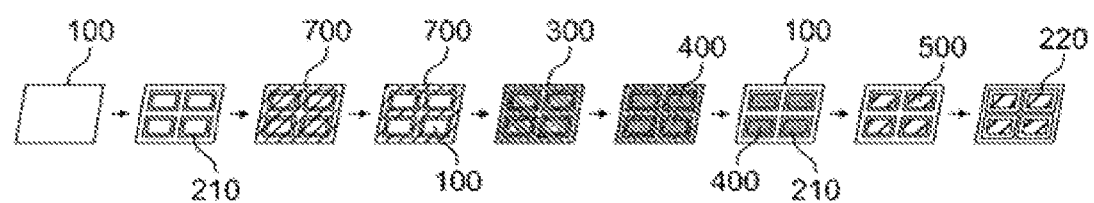
Figure 11:
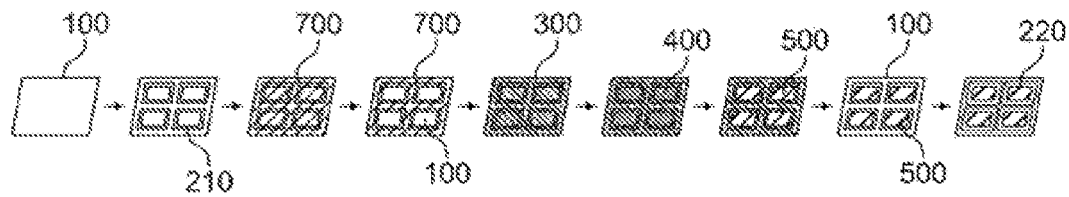
Figure 12:
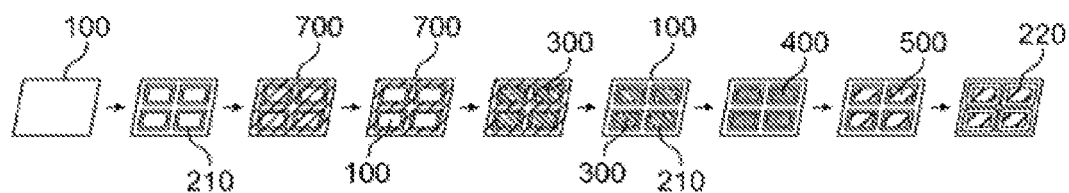
Figure 13:
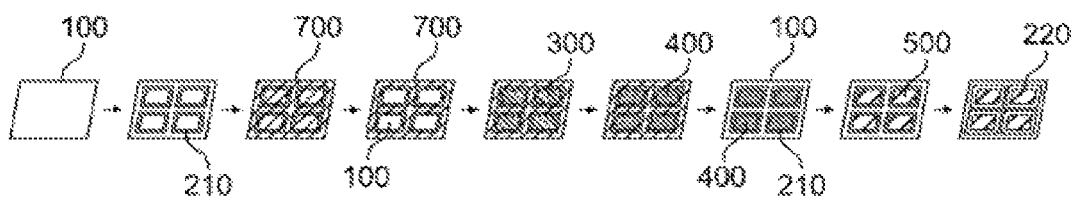
Figure 14:
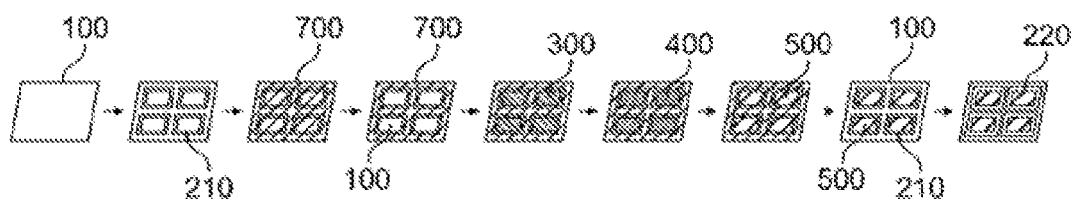
Figure 15:
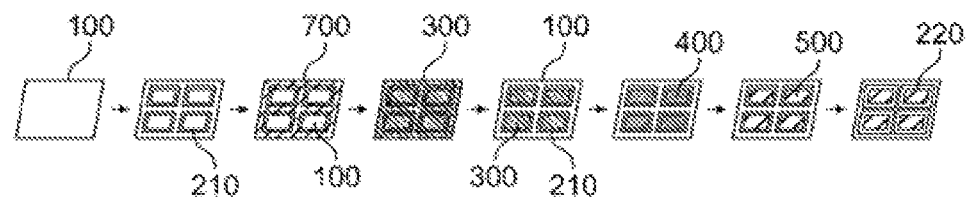
Figure 16:
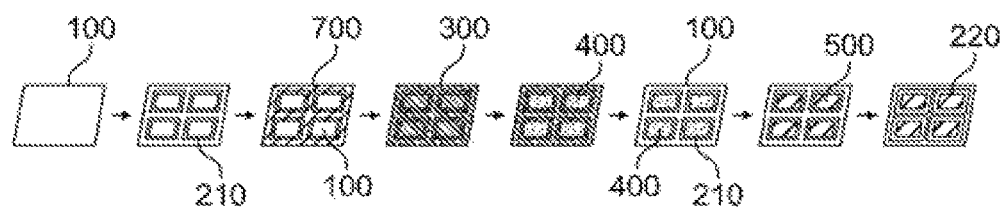
Figure 17:
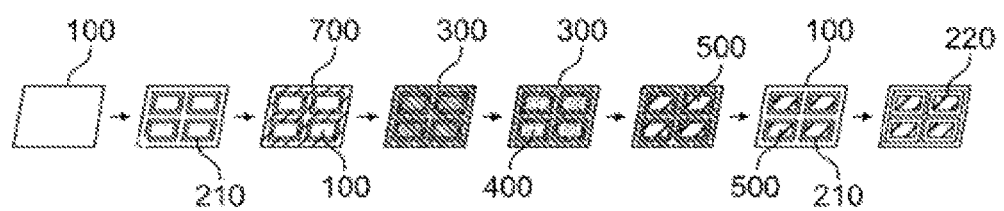
Figure 18:
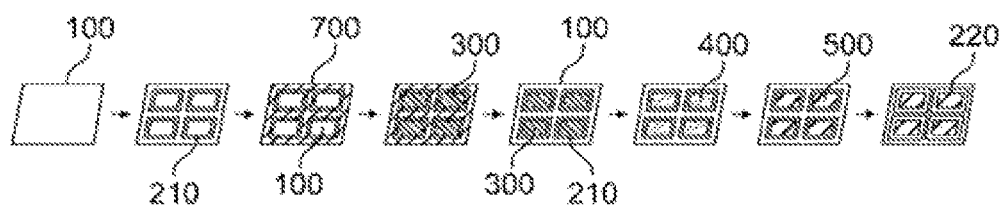
Figure 19:
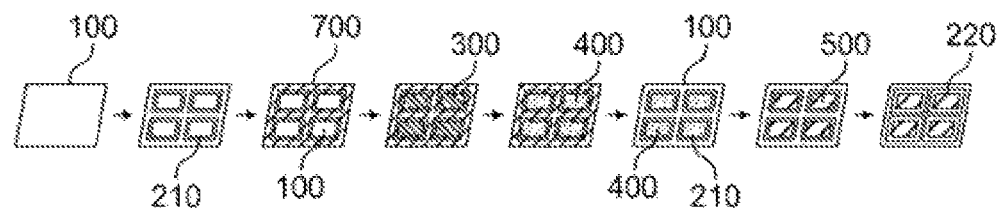
Figure 20:
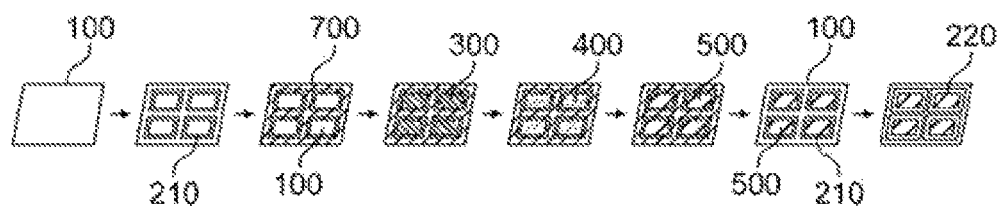

First, as illustrated in (a) of FIG. 7 and FIG. 8, in a base substrate 100 in which a release film 700 having openings corresponding to the display parts is adhered on one surface thereof, the liquid crystal polarizing layer is formed on the display part.

The base substrate 100 may be prepared of any material, which is not particularly limited so long as it has high durability to sufficiently protect a liquid crystal display device, a touch screen panel, and the like, from external forces and allow a user to view the display very well, and any base substrate 100 used in the related art may be adopted without particular limitation thereof. For example, glass, polyethersulfone (PES), polyacrylate (PAR), polyetherimide (PEI), polyethylene naphthalate (PEN), polyethylene terephthalate (PET), polyphenylene sulfide (PPS), polyallylate, polyimide, polycarbonate (PC), cellulose triacetate (TAC), cellulose acetate propionate (CAP), or the like, may be used.

A thickness of the base substrate 100 is not particularly limited, and may be, for example, 10 to 200 μm. If the thickness thereof is less than 10 μm, it is difficult to achieve a sufficient hardness, strength, or the like as a window substrate. If the thickness thereof exceeds 200 μm, an entire thickness of the window substrate may be increased to causes a difficulty in reducing a thickness and weight thereof.

The base substrate 100 includes a display part which displays an image when applying to an image display device, and a non-display part which forms a portion of a housing of an electronic device and does not display the image due to being hidden by the non-display pattern 200. For example, the image may be output in the non-display part, but since the image displayed on the non-display part is hidden by the non-display pattern 200, the user may not view the image.

FIGS. 7 and 8 illustrate a case of performing a process on the mother substrate including a plurality of unit cells for each unit cell, such that, the release film 700 is illustrated as having a plurality of openings corresponding to the display parts of the individual unit cell. But it is not limited thereto, the process may be performed on the base substrate 100 having one unit cell size of an individual product.

Since the release film 700 has the openings corresponding to the display parts of the base substrate 100, when adhering the same to the base substrate 100, only the display parts are exposed through the openings.

The release film 700 defines the display part and the non-display part, thereby it is possible to prevent a coating material from being flown to the non-display part during forming the liquid crystal polarizing layer 300 by coating, and prevent a loss of the coating material, such that the liquid crystal polarizing layer 300 may be easily formed on only the display part.

A thickness of the release film 700 is not particularly limited, and may be, for example, 1 to 100 μm.

It is preferable that the release film 700 has a thickness of the liquid crystal polarizing layer 300 or more in terms of manufacturing process efficiencies. When further including the retardation layer 400 or the refractive index control layer 500 of the window substrate of the present invention, it is preferable that the release film 700 has a thickness of a sum of the liquid crystal polarizing layer 300 and the above-described layers or more.

The step of forming the liquid crystal polarizing layer 300 may include: coating an alignment layer 310 and conducting alignment treatment of the alignment layer 310; coating a liquid crystal layer 320 on the alignment layer 310 subjected to the alignment treatment; and curing the liquid crystal layer 320.

A method of coating the alignment layer 310 and the liquid crystal layer 320 is not particularly limited, but may include, for example, slit coating, knife coating, spin coating, casting, micro gravure coating, gravure coating, bar coating, roll coating, wire-bar coating, dip coating, spray coating, screen printing, gravure printing, flexo printing, offset printing, ink-jet coating, dispenser printing, nozzle coating, capillary coating, and the like.

The alignment treatment of the alignment layer 310 may be performed by rubbing the alignment layer 310 using a rubbing roll, for example, but it is not limited thereto, and may be performed by any method known in the related art.

The coated liquid crystal layer 320 may be cured using UV rays or heat.

A thickness of the liquid crystal polarizing layer 300 is not particularly limited, and may be, for example, 1 to 30 μm. If the thickness thereof is less than 1 μm, adhesion of the liquid crystal polarizing layer 300 with respect to the base substrate 100 may be insufficient. If the thickness thereof exceeds 30 μm, the entire thickness of the window substrate may be increased to causes a difficulty in reducing a thickness thereof.

The inventive method may further include adhering the release film 700 on the one surface of the base substrate 100.

After adhering the release film 700, the release film 700 may be cut so as to have openings corresponding to the display parts, and cutting may be previously performed, then the release film 700 having the openings may be adhered thereto.

If necessary, the method of preparing a window substrate integrated with a polarizing plate of the present invention may further include forming a retardation layer 400 on the liquid crystal polarizing layer 300, and in addition, forming a refractive index control layer 500 on the retardation layer 400.

The retardation layer 400 may be formed by coating the retardation layer 400 on the liquid crystal polarizing layer 300, or adhering a retardation film thereto.

A method of coating the retardation layer 400 is not particularly limited, but may include, for example, slit coating, knife coating, spin coating, casting, micro gravure coating, gravure coating, bar coating, roll coating, wire-bar coating, dip coating, spray coating, screen printing, gravure printing, flexo printing, offset printing, ink-jet coating, dispenser printing, nozzle coating, capillary coating, and the like.

The retardation layer 400 may be a single layer or a double layer, and in a case of the single layer, the retardation layer may be a ¼ wavelength plate, while in a case of the double layer, the retardation layer may be a ½ wavelength plate, but it is not limited thereto. When the retardation layer is a double layer of the ¼ wavelength plate and the ½ wavelength plate, it is possible to obtain excellent color sense and image quality due to retardation correction when applying to an image display device.

A thickness of the retardation layer 400 is not particularly limited, and may be, for example, 1 to 100 μm. If the thickness thereof is less than 1 μm, retardation properties may be decreased. If the thickness thereof exceeds 100 μm, the entire thickness of the window substrate may be increased to causes a difficulty in reducing a thickness thereof.

The refractive index control layer 500 may be formed by coating the refractive index control layer 500 on the retardation layer 400, or adhering a refractive index control film thereto.

A method of coating the refractive index control layer 500 is not particularly limited, but may include, for example, slit coating, knife coating, spin coating, casting, micro gravure coating, gravure coating, bar coating, roll coating, wire-bar coating, dip coating, spray coating, screen printing, gravure printing, flexo printing, offset printing, ink-jet coating, dispenser printing, nozzle coating, capillary coating, and the like.

The refractive index control layer 500 is a layer that serves to improve the color sense by controlling a refractive index when applying to the image display device.

The refractive index control layer 500 may be a coating layer or a film. For example, the refractive index control layer 500 may use an elongated film type or liquid crystal coating type C-plate.

A thickness of the refractive index control layer 500 is not particularly limited, and may be, for example, 1 to 30 μm. If the thickness thereof is less than 1 μm, retardation properties may be decreased. If the thickness thereof exceeds 30 μm, the entire thickness of the window substrate may be increased to causes a difficulty in reducing a thickness of the image display device.

Then, the release film 700 is peeled-off from the one surface of the base substrate 100.

When peeling-off the release film 700, the liquid crystal polarizing layer 300 is formed on the display part, and the non-display part becomes an exposed state.

Then, the non-display pattern 200 is formed on the non-display part of the one surface of the base substrate 100.

The non-display pattern 200 may be formed in a single layer or a double layer by the above-described method, and may have a thickness within the above-described range.

Figure 41:
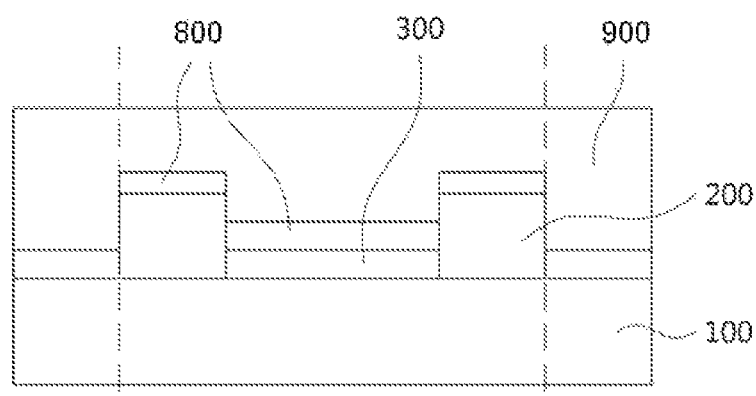
FIG. 41 is a schematic cross-sectional view illustrating a case that the base substrate has an area of unit cell or more, in a method of preparing a window substrate integrated with a polarizing plate according to another embodiment of the present invention.
Figure 42:
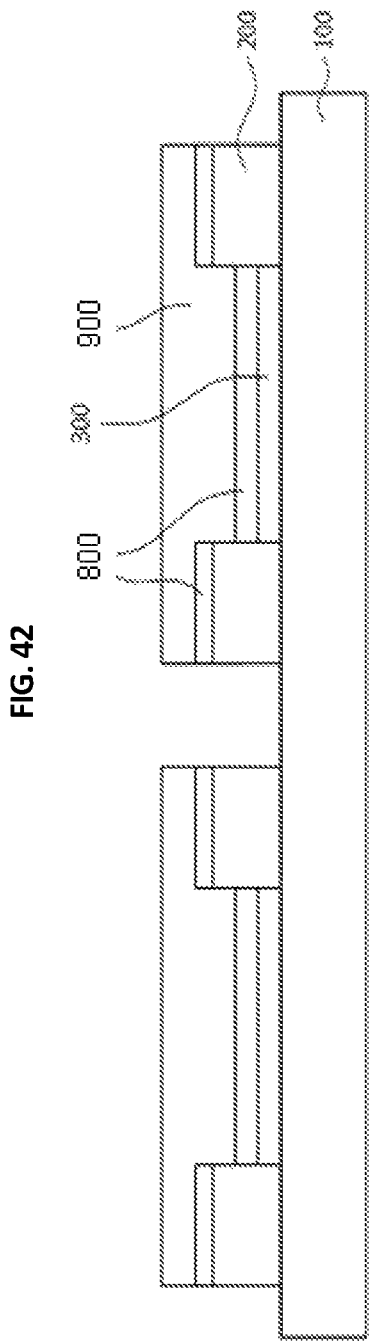
FIG. 42 is a schematic cross-sectional view illustrating a case that the base substrate is a mother substrate including a plurality of unit cells, and each step is performed for each unit cell, in a method of preparing a window substrate integrated with a polarizing plate according to another embodiment of the present invention.

Further, as illustrated in (f) of FIG. 7, when performing the process on the mother substrate including a plurality of unit cells for each unit cell, the base substrate 100 may be cut for each unit cell. Furthermore, this process is also illustrated in FIGS. 41 and 42.

Thereby, it is possible to obtain a window substrate integrated with a polarizing plate having the number corresponding to the number of the unit cells.

FIGS. 23 to 34 are schematic views illustrating processes of a method of preparing a window substrate integrated with a polarizing plate according to various embodiments of the present invention, which includes: forming a liquid crystal polarizing layer on the display part of the base substrate in which a release film having openings corresponding to the display parts adhered to one surface thereof; forming a retardation layer on the liquid crystal polarizing layer; forming a refractive index control layer; peeling-off the release film from the one surface of the base substrate; and forming a non-display pattern on the non-display part of the one surface of the base substrate.

FIGS. 23 to 28 illustrate a case of forming the openings by cutting after adhering the release film 700, and FIGS. 29 to 34 illustrate a case of adhering the release film 700 having the openings so as to expose the display parts.

As illustrated in FIGS. 23 to 25, and 29 to 31, the liquid crystal polarizing layer 300 may be formed on the entire one surface of the base substrate 100, and as illustrated in FIGS. 26 to 28, and 32 to 34, may be formed on only the display part.

A peeling-off time of the release film 700 is not particularly limited, and the release film 700 may be peeled-off, for example, after forming the liquid crystal polarizing layer 300, after forming the retardation layer 400, or after forming the refractive index control layer 500.

What is claimed is:

1. A window substrate integrated with a polarizing plate, comprising:
    a window substrate including a display part and a non-display part;
    a non-display pattern having a color and being disposed directly on the non-display part of one surface of the window substrate, the non-display pattern being formed only on the non-display part that is located on a peripheral portion of the window substrate so that the color of the non-display pattern is viewed only through the non-display part of the window substrate in an unobstructed manner; and
    a liquid crystal polarizing layer disposed only on the display part of the same surface as the non-display part,
    wherein the non-display pattern defines the display part which displays an image and the non-display part which does not display the image; and
    a thickness of the non-display pattern is thicker than a thickness of the liquid crystal polarizing layer.

2. The window substrate integrated with a polarizing plate according to claim 1, wherein the non-display pattern directly contacts the window substrate.

3. The window substrate integrated with a polarizing plate according to claim 1, wherein the non-display pattern includes a first pattern that defines the display part and the non-display part, and a second pattern having a light-shielding property which covers the non-display part on which the first pattern is disposed.

4. The window substrate integrated with a polarizing plate according to claim 1, further comprising a retardation layer disposed on the liquid crystal polarizing layer.

5. The window substrate integrated with a polarizing plate according to claim 4, wherein the retardation layer is a ¼ wavelength plate.

6. The window substrate integrated with a polarizing plate according to claim 4, wherein the retardation layer is a double layer of a ¼ wavelength plate and a ½ wavelength plate.

7. The window substrate integrated with a polarizing plate according to claim 4, further comprising a refractive index control layer disposed on the retardation layer.

8. The window substrate integrated with a polarizing plate according to claim 1, further comprising an aqueous over-coating layer disposed on the liquid crystal polarizing layer; and
    a leveling layer disposed on the over-coating layer to planarize the display part and the non-display part.

9. The window substrate integrated with a polarizing plate according to claim 8, wherein the over-coating layer is disposed on the non-display pattern and the liquid crystal polarizing layer.

10. The window substrate integrated with a polarizing plate according to claim 8, further comprising a retardation layer disposed on the leveling layer.

11. The window substrate integrated with a polarizing plate according to claim 10, wherein the non-display pattern is disposed on at least a portion of the non-display part, and the leveling layer is disposed on a remaining region of the non-display part.

12. The window substrate integrated with a polarizing plate according to claim 11, further comprising a color pattern on a region corresponding to the leveling layer of the non-display part on the retardation layer.

13. The window substrate integrated with a polarizing plate according to claim 12, further comprising a light-shielding pattern on the color pattern.

14. An optical laminate comprising:
the window substrate integrated with a polarizing plate according to claim 1; and
a touch panel disposed on the one surface of the window substrate.

15. An image display device comprising the optical laminate according to claim 14.

16. An image display device comprising:
a liquid crystal display device; and
the window substrate integrated with the polarizing plate according to claim 1 formed on the liquid crystal device to protect the liquid crystal display device.

17. A display device comprising:
an image display device; and
the window substrate integrated with the polarizing plate according to claim 1 formed on the image display device to protect the image display device.

18. A method of preparing a window substrate integrated with a polarizing plate, the method comprising:
preparing a window substrate including a display part and a non-display part;
forming a liquid crystal polarizing layer only on one surface of the window substrate in the display part; and
forming a non-display pattern directly on the one surface of the window substrate in the non-display part, the non-display pattern being formed only on the non-display part that is located on a peripheral portion of the window substrate and the non-display pattern having a color so that the color of the non-display pattern is viewed only through the non-display part of the window substrate in an unobstructed manner,
wherein the non-display pattern defines the display part which displays an image and the non-display part which does not display the image; and
a thickness of the non-display pattern is thicker than a thickness of the liquid crystal polarizing layer.

19. The method according to claim 18, wherein forming the liquid crystal polarizing layer includes:
forming the liquid crystal polarizing layer on a surface of a carrier film; and
peeling-off the liquid crystal polarizing layer from the carrier film to be adhered to the display part of the window substrate.

20. The method according to claim 18, wherein forming the liquid crystal polarizing layer includes:
adhering a release film having an opening that corresponds to the display part to the one surface of the window substrate;
forming the liquid crystal polarizing layer on the display part of the window substrate through the opening of the release film; and
peeling-off the release film.

* * * * *